United States Patent
Harris

(10) Patent No.: US 10,108,268 B2
(45) Date of Patent: *Oct. 23, 2018

(54) TOUCH SENSITIVE DEVICE

(71) Applicant: NVF Tech Ltd., Cambridgeshire (GB)

(72) Inventor: Neil John Harris, Cambridgeshire (GB)

(73) Assignee: NVF Tech Ltd, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/612,778

(22) Filed: Jun. 2, 2017

(65) Prior Publication Data

US 2017/0329408 A1 Nov. 16, 2017

Related U.S. Application Data

(63) Continuation of application No. 14/694,823, filed on Apr. 23, 2015, which is a continuation of application (Continued)

(30) Foreign Application Priority Data

Oct. 3, 2008 (GB) .................................. 0818117.4

(51) Int. Cl.
G06F 3/041 (2006.01)
G06F 3/01 (2006.01)

(52) U.S. Cl.
CPC ............ G06F 3/016 (2013.01); G06F 3/0418 (2013.01)

(58) Field of Classification Search
None
See application file for complete search history.

(56) References Cited

U.S. PATENT DOCUMENTS 4,216,352 A 8/1980 Chamuel
4,885,565 A 12/1989 Embach
(Continued)

FOREIGN PATENT DOCUMENTS

EP 1310860 A1 5/2003
GB 2385409 8/2003
(Continued)

OTHER PUBLICATIONS

International Search Report and Written Opinion issued in International Application No. PCT/JP2009/064365, dated Nov. 10, 2009, 6 pages.

(Continued)

*Primary Examiner* — Dorothy Harris
(74) *Attorney, Agent, or Firm* — Fish & Richardson P.C.

(57) ABSTRACT

A touch sensitive device including a panel capable of supporting bending waves, a user-accessible touch sensitive screen on or forming part of a face of the panel, the touch sensitive screen having a plurality of different sensing areas, a plurality of vibration exciters coupled to the panel to apply bending waves to the panel to provide tactile feedback at the plurality of sensing areas in response to the user touching a sensing area, and signal processing means arranged to apply signals to the vibration exciters so as to steer bending waves applied to the panel by the plurality of vibration exciters whereby the amplitude of the applied bending waves is maximized at the sensing area touched by the user and reduced or minimized at each other sensing area.

14 Claims, 22 Drawing Sheets

Related U.S. Application Data

No. 12/921,935, filed as application No. PCT/JP2009/064365 on Aug. 7, 2009, now Pat. No. 9,041,662.

(56) References Cited

U.S. PATENT DOCUMENTS

| | | | |
|---|---|---|---|
| 5,638,060 A | 6/1997 | Kataoka | |
| 5,977,867 A | 11/1999 | Blouin | |
| 6,429,846 B2 | 8/2002 | Rosenberg | |
| 6,871,149 B2 | 3/2005 | Sullivan | |
| 9,041,662 B2* | 5/2015 | Harris | G06F 3/016 178/18.04 |
| 2002/0075135 A1 | 6/2002 | Bown | |
| 2002/0149561 A1* | 10/2002 | Fukumoto | G01C 21/3664 345/156 |
| 2004/0133366 A1 | 7/2004 | Sullivan | |
| 2006/0097996 A1* | 5/2006 | Tabata | G06F 3/016 345/173 |
| 2006/0192760 A1* | 8/2006 | Moore | G06F 3/016 345/163 |
| 2006/0197753 A1 | 9/2006 | Hotelling | |
| 2006/0238069 A1 | 10/2006 | Maruyama | |
| 2007/0002029 A1* | 1/2007 | Iso | G06F 1/1616 345/173 |
| 2007/0024593 A1* | 2/2007 | Schroeder | G06F 3/016 345/173 |
| 2007/0097073 A1 | 5/2007 | Takashima | |
| 2007/0146334 A1 | 6/2007 | Inokawa | |
| 2009/0079550 A1 | 3/2009 | Makinen | |
| 2009/0284485 A1 | 11/2009 | Colgate | |
| 2010/0079264 A1* | 4/2010 | Hoellwarth | G06F 3/016 340/407.2 |
| 2012/0229407 A1 | 9/2012 | Harris | |

FOREIGN PATENT DOCUMENTS

| | | |
|---|---|---|
| JP | 2005258666 | 9/2005 |
| JP | 2005276089 | 10/2005 |
| JP | 2008123429 | 5/2008 |
| WO | 9709842 | 3/1997 |
| WO | 0148684 | 7/2001 |
| WO | 0154450 | 7/2001 |
| WO | 03005292 | 1/2003 |
| WO | 2004053781 | 6/2004 |
| WO | 2005111968 | 11/2005 |

OTHER PUBLICATIONS

International Preliminary Report on Patentability issued in International Application No. PCT/JP2009/064365, dated Apr. 5, 2011, 5 pages.

Rayleigh, "The Theory of Sound: Title page and Cover page" vol. 2, Macmillan and Co., Ltd. London, 1896, 4 pages.

* cited by examiner

TOUCH SENSITIVE DEVICE

CROSS-REFERENCE TO RELATED APPLICATIONS

This is a continuation application of U.S. patent application Ser. No. 14/694,823 filed Apr. 23, 2015 which is a continuation application of U.S. patent application Ser. No. 12/921,935 filed Dec. 13, 2010, issued 26 May 2105 under U.S. Pat. No. 9,041,662, which is the U.S. National Phase of PCT Application No. JP2009/064365 filed 7 Aug. 2009 which claims priority to British Patent Application No. 0818117.4 filed 3 Oct. 2008, each of which are incorporated herein by reference.

TECHNICAL FIELD

The invention relates to touch sensitive devices including touch sensitive screens or panels.

BACKGROUND ART

U.S. Pat. No. 4,885,565, U.S. Pat. No. 5,638,060, U.S. Pat. No. 5,977,867, US2002/0075135 describe touch-operated apparatus having tactile feedback for a user when touched. In U.S. Pat. No. 4,885,565 an actuator is provided for imparting motion to the CRT when the actuator is energized to provide tactile feedback. In U.S. Pat. No. 5,638,060, a voltage is applied to a piezo-electric element which form a switch to vibrate the element to apply a reaction force to a user's finger. In U.S. Pat. No. 5,977,867, a tactile feedback unit generates a mechanical vibration sensed by the user when the touch screen is touched with a finger or a pointer. The amplitude, vibration frequency and pulse length of the mechanical vibration are controlled, with the pulse width being long enough to be felt but short enough to terminate before the next key touch. US2002/0075135 describes the use of a second transducer to provide a pulse in the form of a transient spike to simulate a button click.

In each of the prior art documents described above, tactile feedback is provided in response to a discrete touch, of a user's finger or pointer.

DISCLOSURE OF INVENTION

According to the invention, there is provided a touch sensitive device comprising a panel capable of supporting bending waves, a user-accessible touch sensitive screen on or forming part of a face of the panel, the touch sensitive screen having a plurality of different sensing areas, a plurality of vibration exciters coupled to a panel to apply bending waves to the panel to provide tactile feedback at the plurality of sensing areas in response to the user touching a sensing area, and signal processing means arranged to apply signals to the vibration exciters so as to steer bending waves applied to the panel by the plurality of vibration exciters whereby the amplitude of the applied bending waves is maximised at the sensing area touched by the user and reduced or minimised at each other sensing area.

As a result of the signal processing means, there is a wanted signal (the maximised vibration at one sensing area) and an unwanted signal (minimised vibration at another sensing area). The ratio of the two may be described as a "signal to noise ratio", or "SNR". This is usually expressed in dB, and large values are better than small values.

By steering the vibration, it is possible to ensure that each sensing area or location receives primarily the haptics signal for that location, even when the locations are simultaneously contacted. Anywhere else on the panel will experience a combination of the signals, but this is unimportant. For two sensing areas, this feature may be termed simultaneous dual region haptics since two simultaneous haptic feedbacks are provided at spatially separate locations. This may be extended to multiple signals and multiple regions to provide simultaneous multi-region haptics.

As an alternative, or in addition, to providing simultaneous multi-region haptics, the signal processing means may be arranged to apply bending wave signals having a small or minimal acoustic component. This may be desirable to ensure that the haptic signal provided to each location is silent.

The panel may be intendedly resonant and wherein the signals applied by the vibration exciters cause the panel to resonant. For example, the panel may be a resonant bending wave mode panel as described in International Patent Application WO97/09842 which is incorporated by reference. The panel may also be a loudspeaker wherein a further vibration exciter excites vibration which produces an acoustic output.

The vibration exciters may be a moving coil transducer and/or a piezoelectric bending transducer, for example one comprising a resonant element as described e.g. in WO01/54450, incorporated herein by reference. The exciters may/may not be inertial.

The signal steering may be such that the signal sensing area touched by the user is caused to be antinodal and each other signal sensing area is caused to be nodal. A nodal point (node) is one that has no velocity at any frequency of excitation and an anti-nodal point has maximum velocity.

The device may comprise n number of signal sensing areas and greater than n, e.g. n+1, number of vibration exciters. In this way, the amplitude of the applied bending waves is maximised to the greatest possible amplitude at the sensing area touched by the user and is approximately zero at each other sensing area. In other words, n nodal responses may be achieved. In this context, the requirement for "silent" may be considered equivalent to producing a nodal pressure on axis. To achieve silent dual region haptic feedback, it would be necessary to create both a nodal point, say at the other sensing area, and zero pressure on axis.

Alternatively, there may be n number of signal sensing areas and n or fewer than n number of vibration exciters. In this arrangement, it is still possible to provide a "lowest energy" solution whereby the amplitude of the applied bending waves is maximised at the sensing area touched by the user and minimised at each other sensing area. However, the maximum amplitude may be less than the greatest possible amplitude achieved with n+1 vibration exciters and/or the minimum may be significantly greater than zero. Such a solution may either do its best to achieve all desired nodal responses equally, or else achieve some better than others. In other words solving MR and silent haptics simultaneously may reduce both pressure and velocity responses, but not all the way to zero. To achieve an exact solution requires a number of vibration exciters greater than n.

With a greater number of vibration exciters, e.g. greater than n+1, it should be possible to introduce additional nodal points to improve the haptic response. It may also be possible to reduce the acoustic output even further, by encouraging multi-pole radiation.

The introduction of additional nodal points may allow the non-moving region to extend beyond the point chosen along "nodal lines". The direction and shape of the lines are frequency dependent, changing shape at each mode in the system. Groups of nodes may be observed in order to reduce the motion along a line. If this line is naturally nodal over part of the frequency range, the method is more likely to be successful than for an arbitrary line. The nodal line may be steered away from a natural line of symmetry.

For the general 'm' input (i.e. signals to be applied to m number of vibration exciters), 'n' output (i.e. n number of sensing areas or n−1 number of sensing areas and the desire for silent haptics) problem there are two principle variations on an algorithm to find the best m inputs. These may be referred to as the parallel "all at once" eigenvalue method and the serial "one at a time" eigenvalue method. For the specific case where there are two vibration exciters and one silent sensing area or two sensing areas, a "tan theta" algorithm may be used to define the signals to be applied to the exciters.

The signal processing means may apply signals to the vibration exciters so as simultaneously to provide tactile feedback at a plurality of the sensing areas. In an embodiment the panel is terminated to reduce edge reflections of bending wave vibration.

According to another aspect of the invention, there is provided method of operating a touch sensitive device as claimed in any preceding claim, comprising the steps of sensing an area of screen touched by a user and processing and applying signals to the plurality of vibration exciters to steer bending waves in the panel whereby the amplitude of vibration is maximized at the sensing area touched by the user and reduced or minimized at each other sensing area.

The signals applied to the vibration exciters may be processed so as simultaneously to provide tactile feedback to a plurality of sensing areas while reducing or minimizing crosstalk between the sensing areas.

Contact on the screen may be detected and/or tracked as described in International patent applications WO 01/48684, WO 03/005292 and/or WO 04/053781 to the present applicant. These International patent applications are here incorporated by reference.

Alternately, other known methods may be used to receive and record or sense such contacts.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As a skilled person will appreciate such code and/or data may be distributed between a plurality of coupled components in communication with one another.

BRIEF DESCRIPTION OF THE DRAWINGS

The invention is diagrammatically illustrated, by way of example, in the accompanying drawings in which:—

FIG. 5b is a graph plotting the resultant velocity at two points on the touch screen for the inputs of FIG. 4a.

DESCRIPTION OF EMBODIMENTS

Figure 1A:
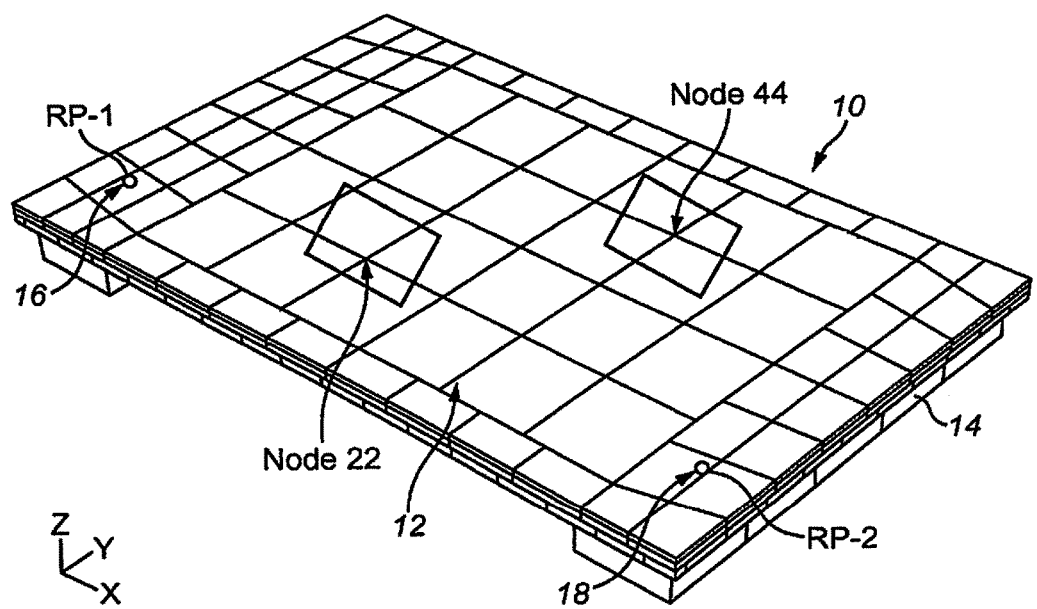
FIG. 1a is a plan view of a touch sensitive screen.
Figure 1B:
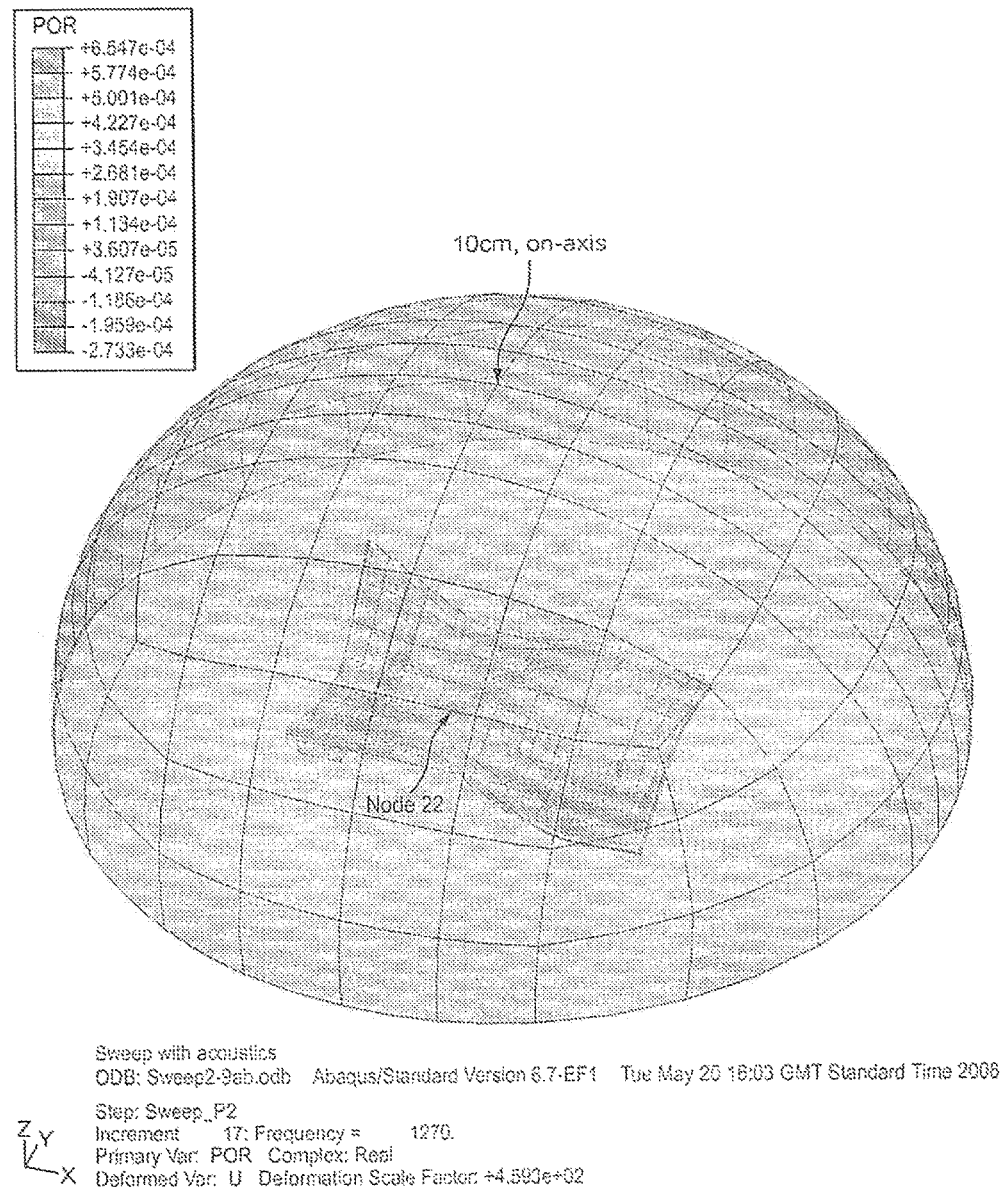
FIG. 1b is an FE model of the screen of FIG. 1a showing internal and external acoustics.

FIG. 1a shows a model of a touch sensitive device 10 comprising a touch sensitive screen 12 mounted on a gasket 14. Two vibration exciters 16, 18 in the form of distributed mode actuators (DMAs) are provided to generate a signal within the screen. One or more sensors (not shown) are used to detect a touch or movement of the stylus on the screen. As shown in FIG. 1b, external air is modelled explicitly to 10 cm, and implicitly to infinity.

To model the system, the two exciters were each crudely simulated by point sources and a frequency dependent force.

Both the panel itself, and the placement of the DMAs have asymmetry in one axis or the other. As a first step, forces are applied separately to drive-points RP-1 (driven by the first exciter 16) and RP-2 (driven by the second exciter 18). The responses at all points in the system are calculated.

Figure 2A:
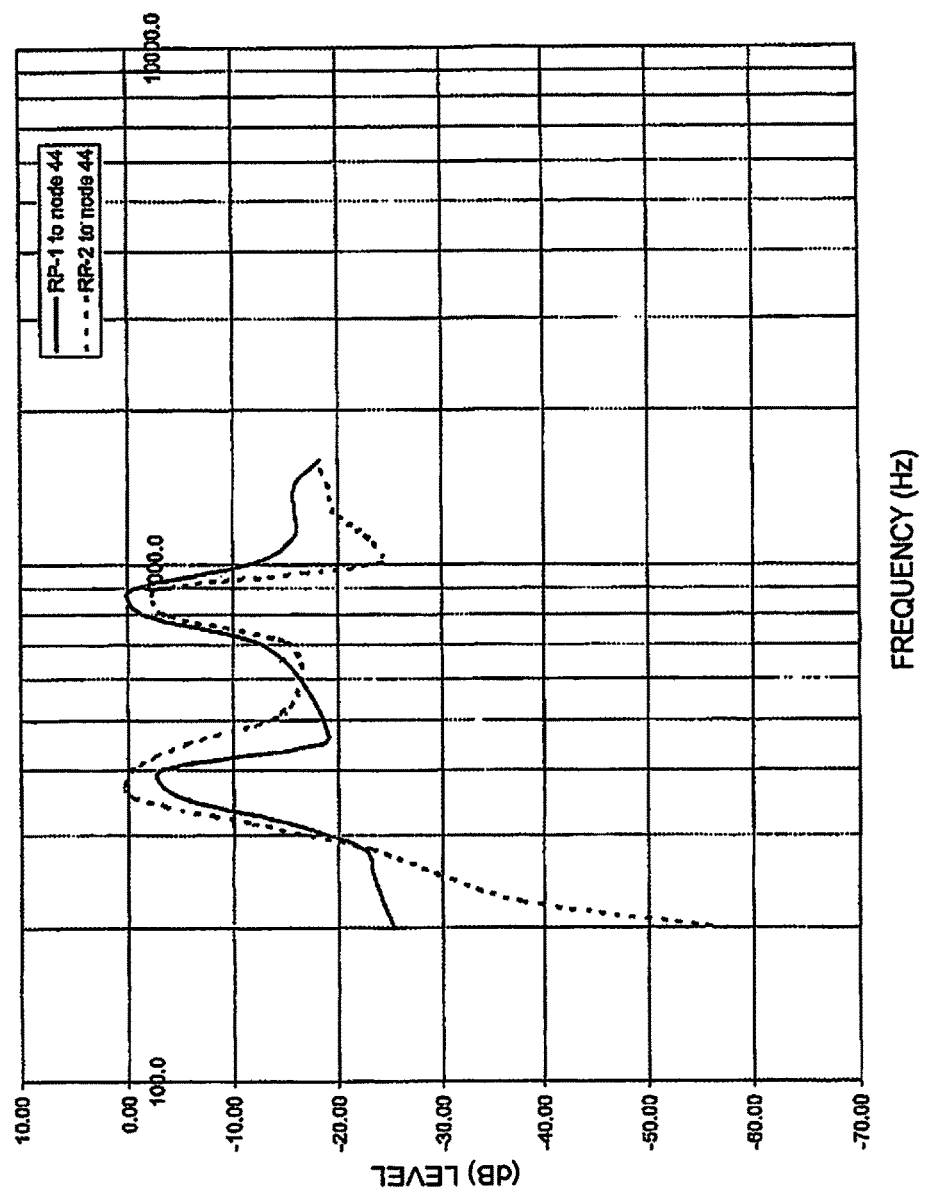
FIG. 2a is a graph showing transadmittance (dB) against frequency at node 44 for nominal 1N inputs applied at two locations.
Figure 2B:
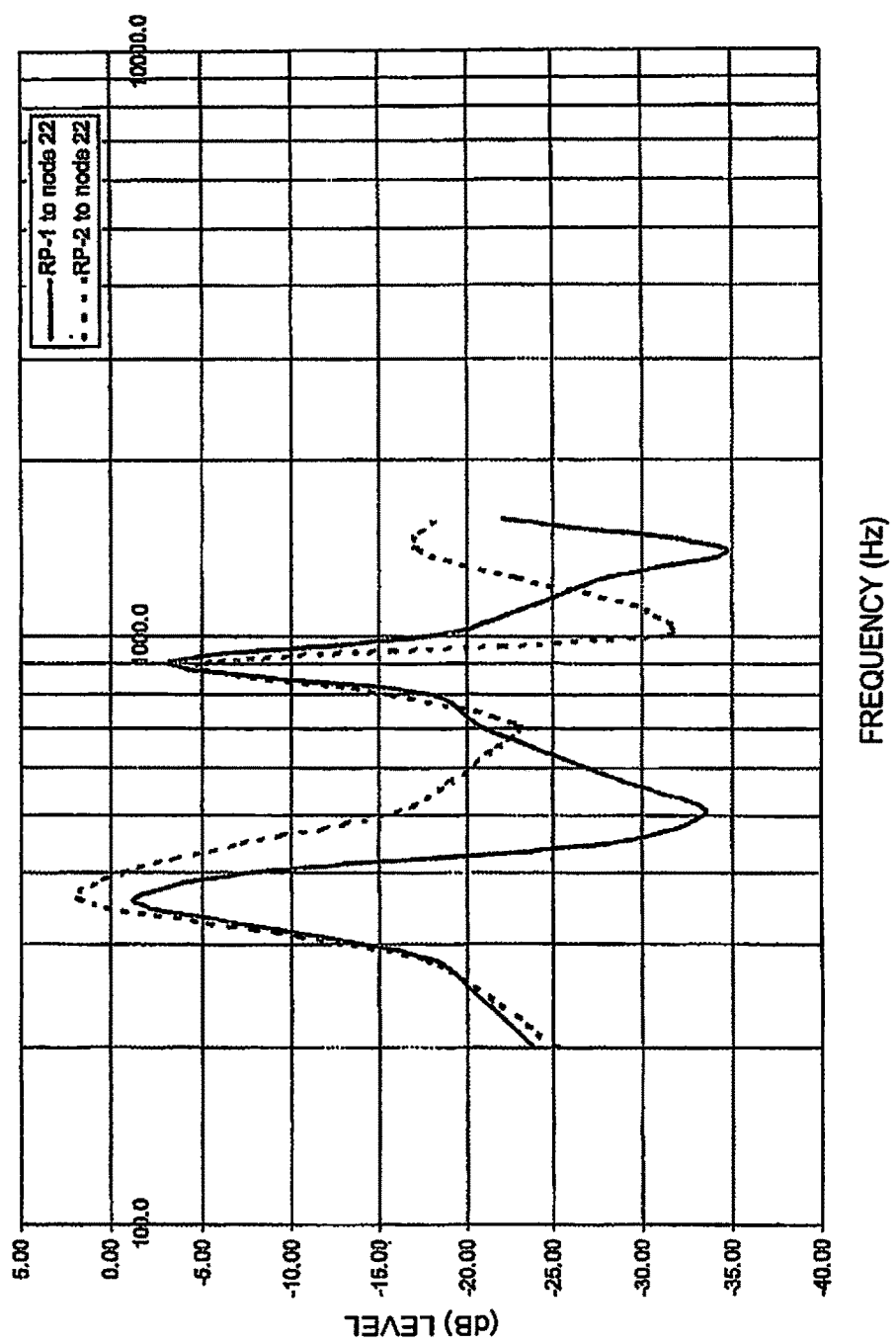
FIG. 2b is a graph showing transadmittance (dB) against frequency at node 22 for nominal 1N inputs applied at two locations.
Figure 2C:
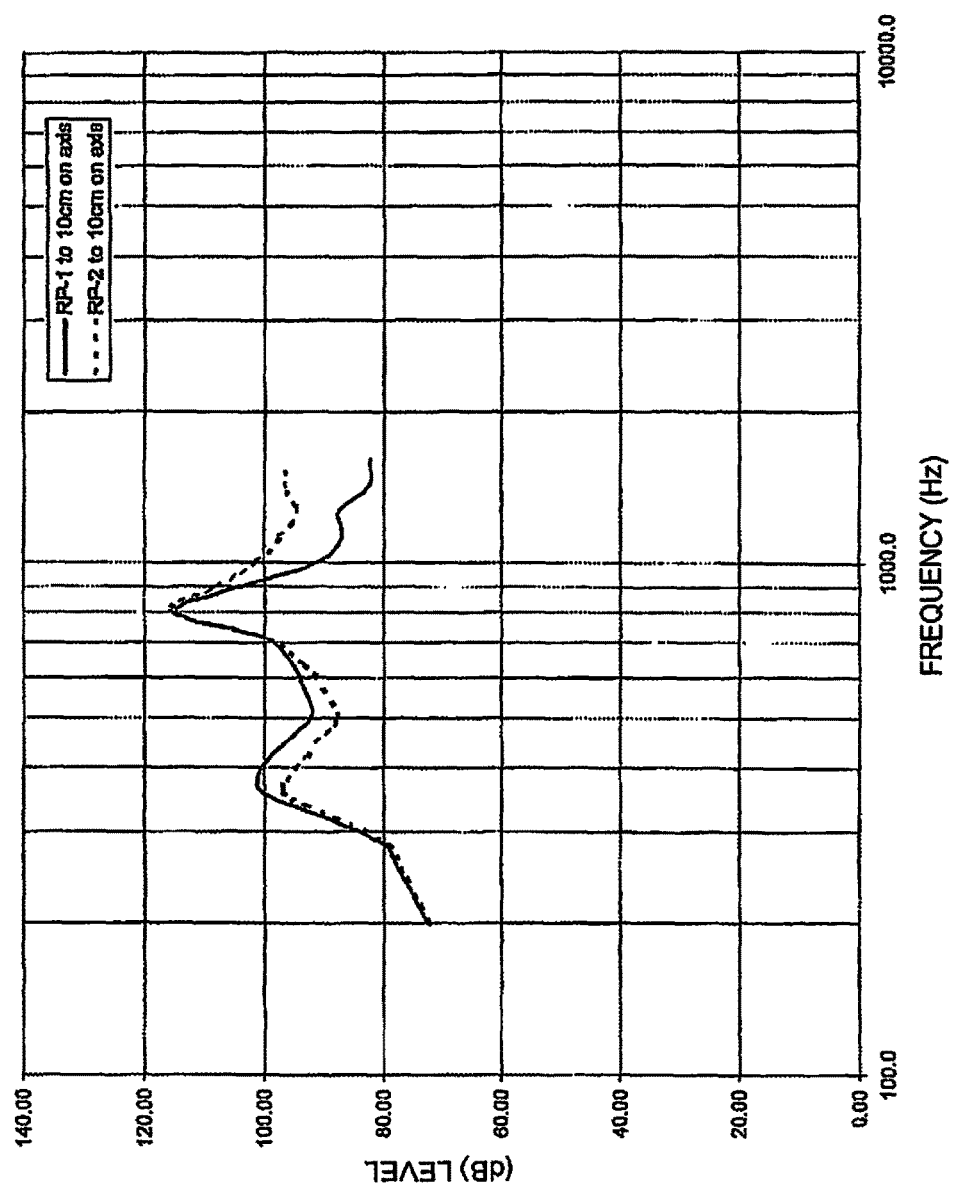
FIG. 2c is a graph showing sound pressure level (dB) against frequency at 10 cm on axis for nominal 1N inputs applied at two locations.

FIG. 2b shows the velocity responses (transadmittance) against frequency for each input at a particular output node (node 22) on the outer surface. The box around node 22 shown in FIG. 1a defines a first sensing area. The dB scale is relative to 1 m/s/N. Below about 350-400 Hz the responses from each input are quite similar, but at higher frequencies they separate. FIG. 2a shows the velocity responses (transadmittance) against frequency for each input at a second output node (node 44) on the outer surface. The box around node 44 shown in FIG. 1a defines a second sensing area. The responses at this node are of a similar character, but different in detail, to those at node 22. FIG. 2c shows the sound pressure level against frequency for each input at 10 cm on axis. In each Figure, the real part of the signal is shown as a solid line and the imaginary part as a dotted line.

Figure 3A:
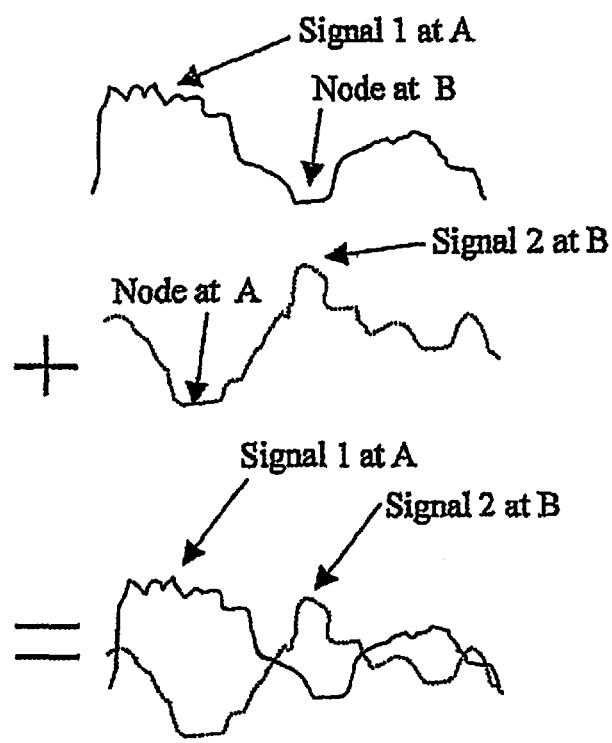
FIG. 3a is an illustration of two haptic signals at a separate location.

A haptics signal provides tactile feedback to a user of the touch sensitive screen. There may be more than one location on the screen which is touched by a user and it is desirable that each location receives only the haptics signal for that location, even when the locations are simultaneously contacted. As shown in FIG. 3a, this may be achieved by ensuring that when points A and B are simultaneously contacted, the transfer functions for the signals applied to the first and second exciters 16, 18 produce a node at A and the required haptics signal at point B and produce a node at point B and the required haptics signal at point A. In other words, for each touch point, the transfer functions necessary to produce a node at the other touch point are obtained, and these
used to provide the appropriate haptic signal. A nodal point (node) is one that has no velocity at any frequency of excitation.

Figure 3B:
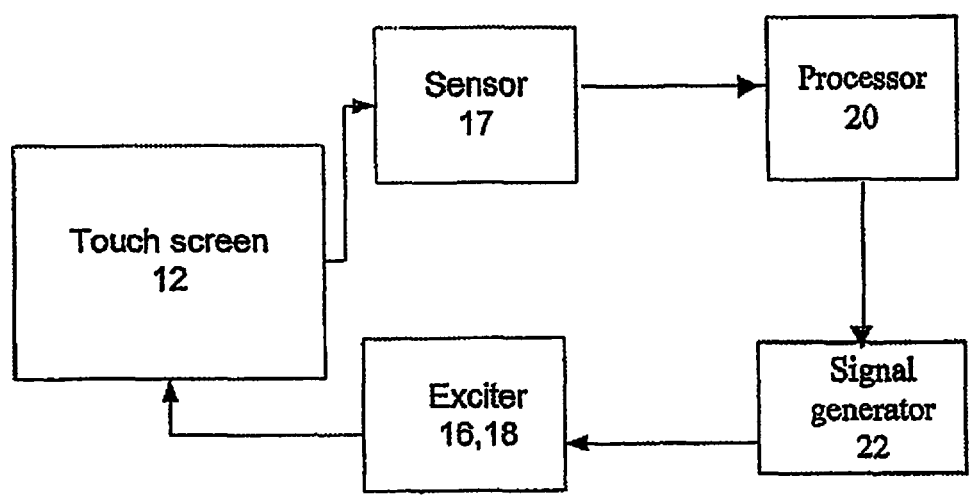
FIG. 3b is a block diagram of the components of the device.

FIG. 3b is a block diagram showing the key processing elements of the system. Contacts on the touch screen 12 are detected by one or more sensors 17 and the output from the sensors 17 is fed to a processor 20. The processor determines the signals to be applied to the exciters 16, 18 as explained in more detail below. These signals are applied to the exciters using a signal generator 22. It will be appreciated that although the signal generator and processor are shown as separate entities, the processor functionality may be incorporated into the signal generator functionality. The exciters 16, 18 apply bending wave vibration to the touch screen.

As shown in FIG. 3a, by linear superposition, each touch point receives only its intended haptic signal. Anywhere else on the panel will experience a combination of the signals, but this is unimportant. This feature may be termed simultaneous duel region haptics since two simultaneous haptic feedbacks are provided at spatially separate locations. This may be extended to multiple signals and multiple regions to provide simultaneous multi-region haptics.

As an alternative, or in addition, to providing simultaneous dual region haptics, it may be desirable to ensure that the haptic signal provided to each location is silent. In this context, the requirement for "silent" may be considered equivalent to producing a nodal pressure on axis. To achieve silent dual region haptic feedback, it would be necessary to create both a nodal point, say at node 22, and zero pressure on axis. As shown in FIGS. 2a and 2c, the problem is complicated by the fact that the two outputs are very different in behavior and amplitude, so some scaling of the responses will be needed.

In JWS Rayleigh "The Theory of Sound", volume 2, Rayleigh teaches a scaling factor that relates velocity and pressure. In words, his first integral theorem states that the pressure at distance r from a baffled source of area A, moving with means acceleration <a>, is given by $$p = \frac{\rho_0}{2 \cdot \pi \cdot r} \cdot \langle a \rangle \cdot A,$$

$$\text{where } \langle a \rangle = j \cdot \omega \cdot \langle v \rangle = \frac{1}{A} \cdot \oiint a \cdot dA,$$

$\rho_0 = 1.2$ kg m$^{-3}$ is the density of air.

For a piston, the motion is uniform and $\langle a \rangle = a$. For a simply-supported plate, the mean value is related to the peak value by $\langle a \rangle = (2/pi)^2 a$. So a suitable default scaling value for velocity is $$s(f) = j \cdot 2\pi \cdot f \cdot \rho_0 \cdot \frac{A}{2 \cdot \pi \cdot r} \cdot \left(\frac{2}{\pi}\right)^2$$

So the required scaling is a function of frequency, panel area and measuring distance. Using this scaling, a combined error measure is formed:

$$M = s(f) \cdot M1 + M2,$$

where M1 and M2 are the individual error measures for velocity and pressure respectively.

By changing s(f), it is possible to alter the relative weight applied to either the velocity or acoustic minimisation problem. If s=0, the silent haptic behaviour is optimised; if s=infinity, the multi-region behaviour is optimised.

In general, if n nodal responses are desired, then n+1 input channels are required (it is useful to consider the requirement for "silent" as equivalent to producing a nodal pressure on axis). In other words, to achieve both silent feedback and dual region haptic feedback, there are two nodal responses (one on the panel and one at 10 cm on axis) and thus 3 input channels are required. However, in the model of FIG. 1a, there are only two input channels. Accordingly, silent simultaneous dual region haptic feedback may not be achieved exactly with only these two input channels, another input channel is required. However, as in this case, if there are fewer than n+1 input channels, it is still possible to provide a "lowest energy" solution that may either do its best to achieve all desired nodal responses equally, or else achieve some better than others. The method involves calculating transfer functions for each input that will result in the desired effect.

Figure 4A:
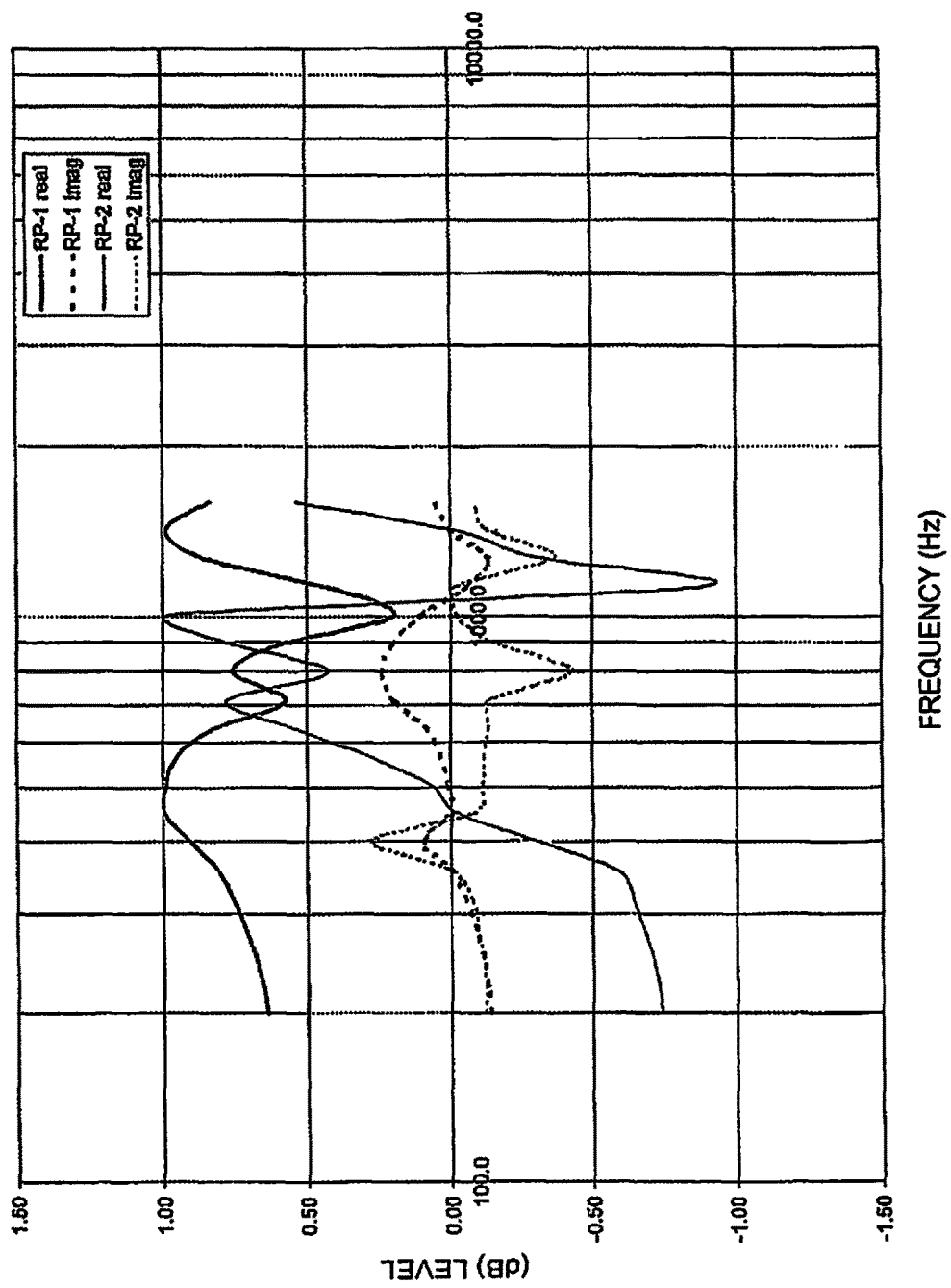
FIG. 4a is a graph showing the input spectra for each exciter to achieve dual region haptics.
Figure 4B:
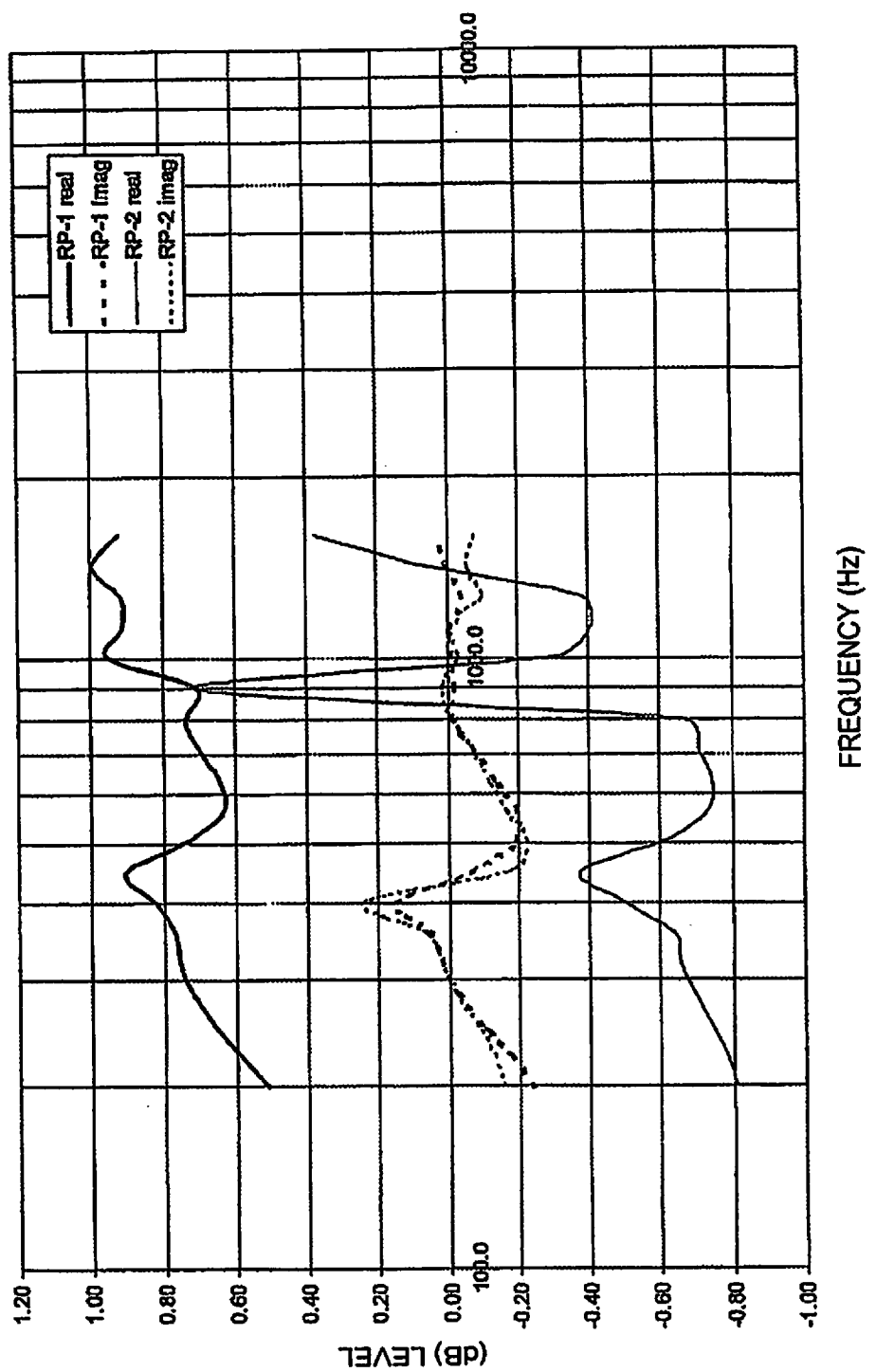
FIG. 4b is a graph showing the input spectra for each exciter to optimise silent dual region haptics.

FIG. 4a shows the input signal spectra applied to each exciter 16, 18 to make node 22 remain stationary (i.e. to produce a nodal point) to solve the dual haptics problem. In the sub-modal range, the functions producing these spectra may be approximated by a constant, or a slowly changing spectrum. Over the wider band, it may be sufficient to use active filter sections; for example, a mild (3 dB at 500 Hz) peaking EQ for channel 1 constant, and a phase changer for channel 2 to change the gain from +0.7 to −0.7 between 400 Hz and 700 Hz. FIG. 4b shows the input signal spectra applied to each exciter 16, 18 to optimise the solution to the silent dual haptics problem. These results are obtained by either the "tan theta" method described below or the "scaled eigenvector" method described below.

Figure 5A:
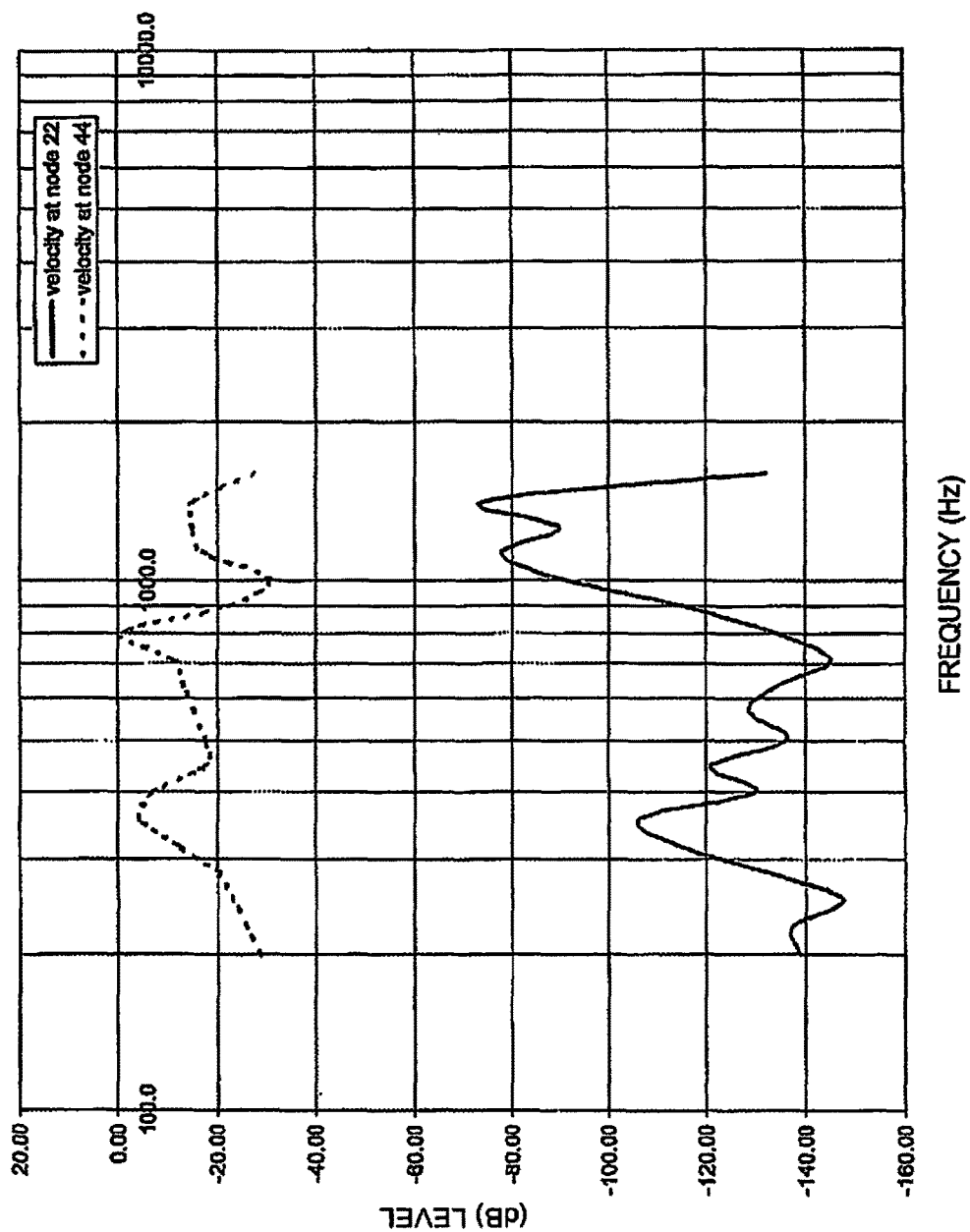
FIG. 5a is a graph showing the residual responses (sound pressure level) against frequency for the velocity and pressure for the inputs of FIGS. 4a and 4b.

FIG. 5a shows that solving the silent haptics problem gives zero pressure on-axis, but leaves a residual velocity at node 22. Conversely, solving the multi-region (MR) haptics problem gives zero velocity at node 22 but leaves a residual pressure on axis. The combined optimised solution of FIG. 4b results in a general reduction in velocity when compared to the silent haptics optimisation. Similarly, the combined optimised solution of FIG. 4b results in a general reduction in pressure when compared to the dual or multi-region haptics optimisation. The improvement in velocity is concentrated at lower frequencies and the improvement in pressure is concentrated at higher frequencies. The balance of these improvements could be altered by changing the scaling factor s(f).

Figure 5B:
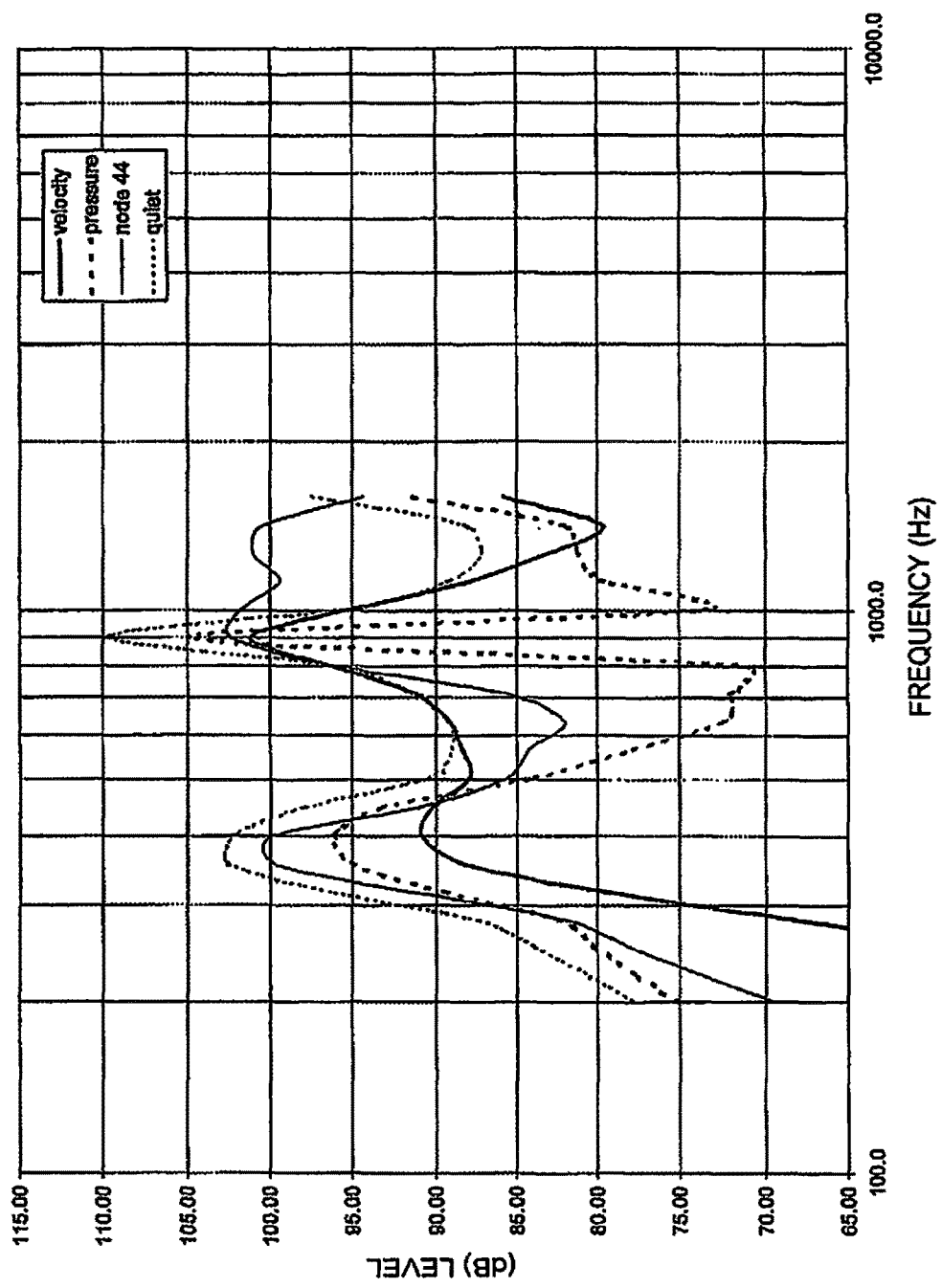

The effectiveness of the dual-region (MR) effect is measured as a signal to noise ratio (SNR) between node 44 (the signal) and node 22 (the noise). For the MR optimisation, this is infinite. FIG. 5b shows the results for quiet haptics optimisation and for combined optimisation. The combined optimisation improves the SNR for frequencies below 450 Hz.

Figure 5C:
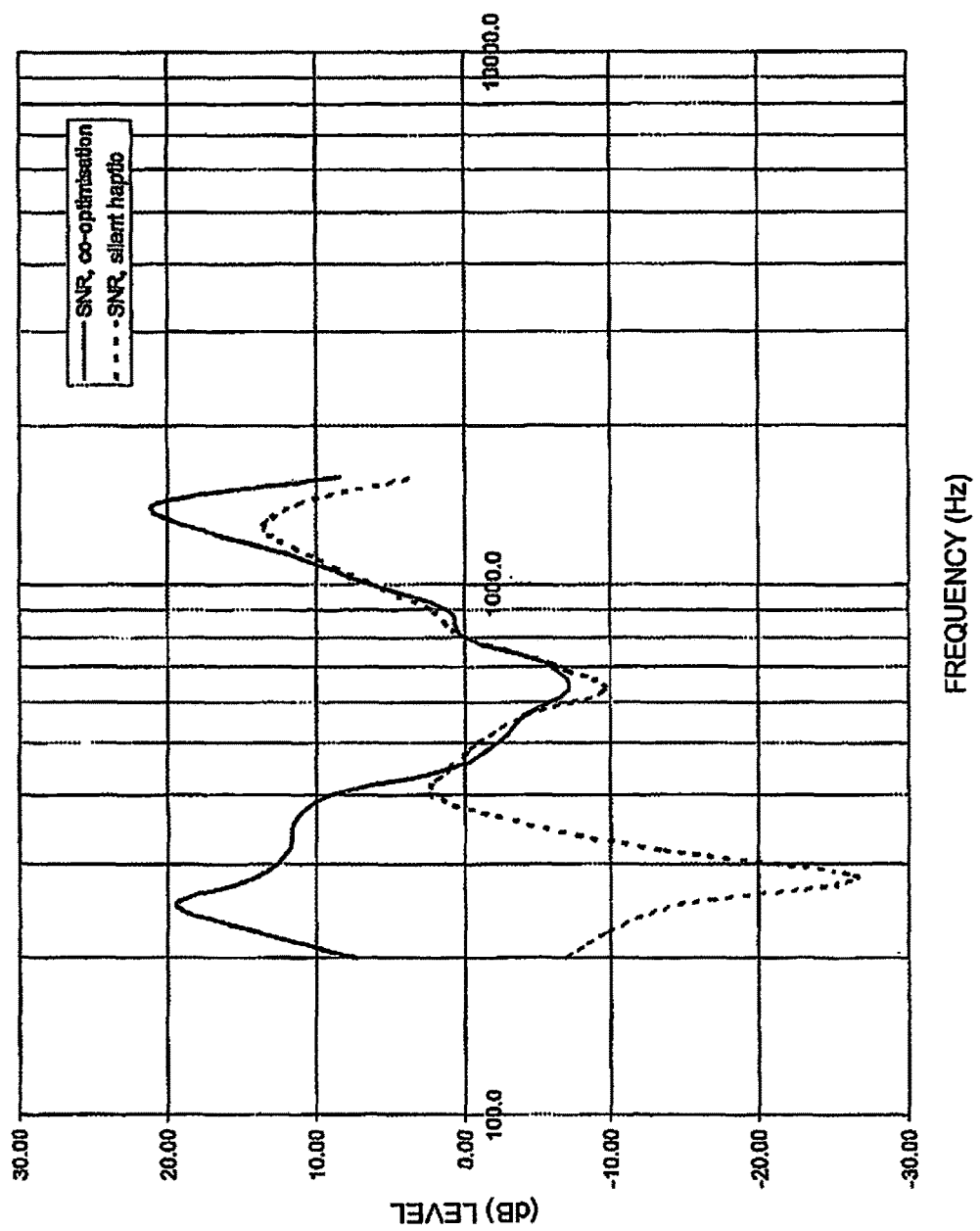
FIG. 5c is a graph plotting the Signal to Noise Ratio (SNR) against frequency for the inputs of FIGS. 4a and 4b.

The exactness of any optimisation, including the MR optimisation, is set by the numerical accuracy of the data supplied to the FE program and its own processing. As shown in FIG. 5c, with coefficients accurate to 6 decimal places, 120 dB of separation between the nodes 22 and 44 was achieved.

By using linear superposition as illustrated in FIG. 3a, it is a trivial step from having a quiet zone at node 22 to having two zones with different signals, i.e. different feedback signals at nodes 22 and 44. If it is possible to produce a single nodal point, it is also possible to do simultaneous dual region haptics. That is, we handle two, simultaneous haptic feedbacks at spatially separate locations. The first touch requires no special treatment—we use our two channels to keep the acoustic output as low as possible. On the second touch, the following must take place. For each touch point, the transfer function necessary to produce a node at the other touch point are obtained, and these used to provide the appropriate haptic signal. By linear superposition, each touch point receives only its intended haptic signal. Anywhere else on the panel will experience a combination of the signals, but this is unimportant.

Figure 6:
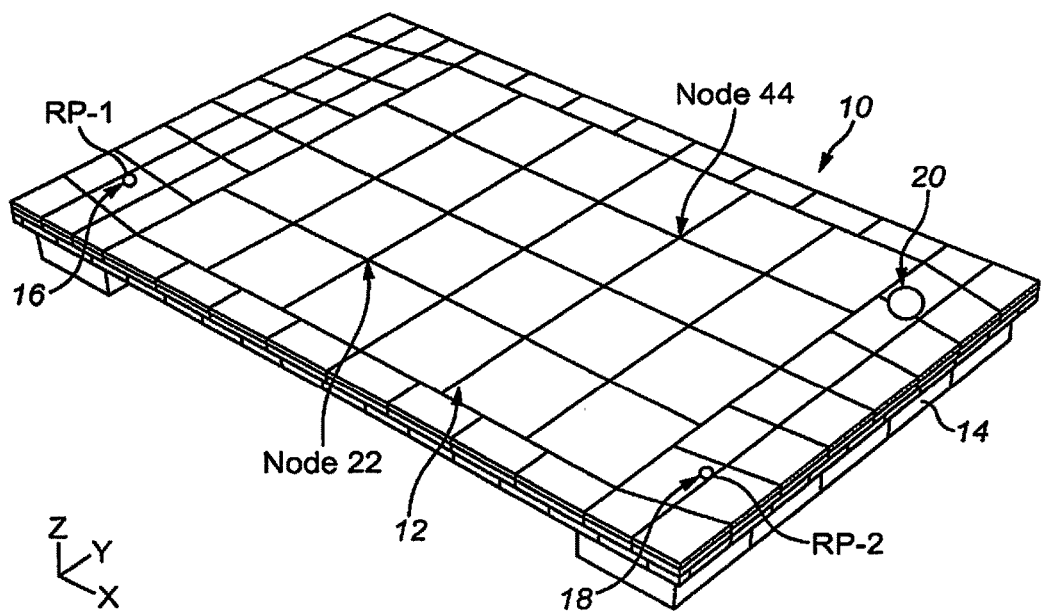
FIG. 6 is an alternative touch sensitive device.

As shown above solving MR and silent haptics simultaneously will reduce both pressure and velocity responses, but not all the way to zero. To achieve an exact solution requires another input channel. FIG. 6 shows a variation of the system in FIG. 1a with three inputs. The number of inputs exceeds the number of outputs, so there is an exact solution to silent dual region haptics optimization. In this case, the on-axis pressure is zero and the velocity at node 22 is also zero. A third exciter 20 providing a signal RP-3 has been added at a position laterally symmetrical to the second exciter 18.

Figure 7A:
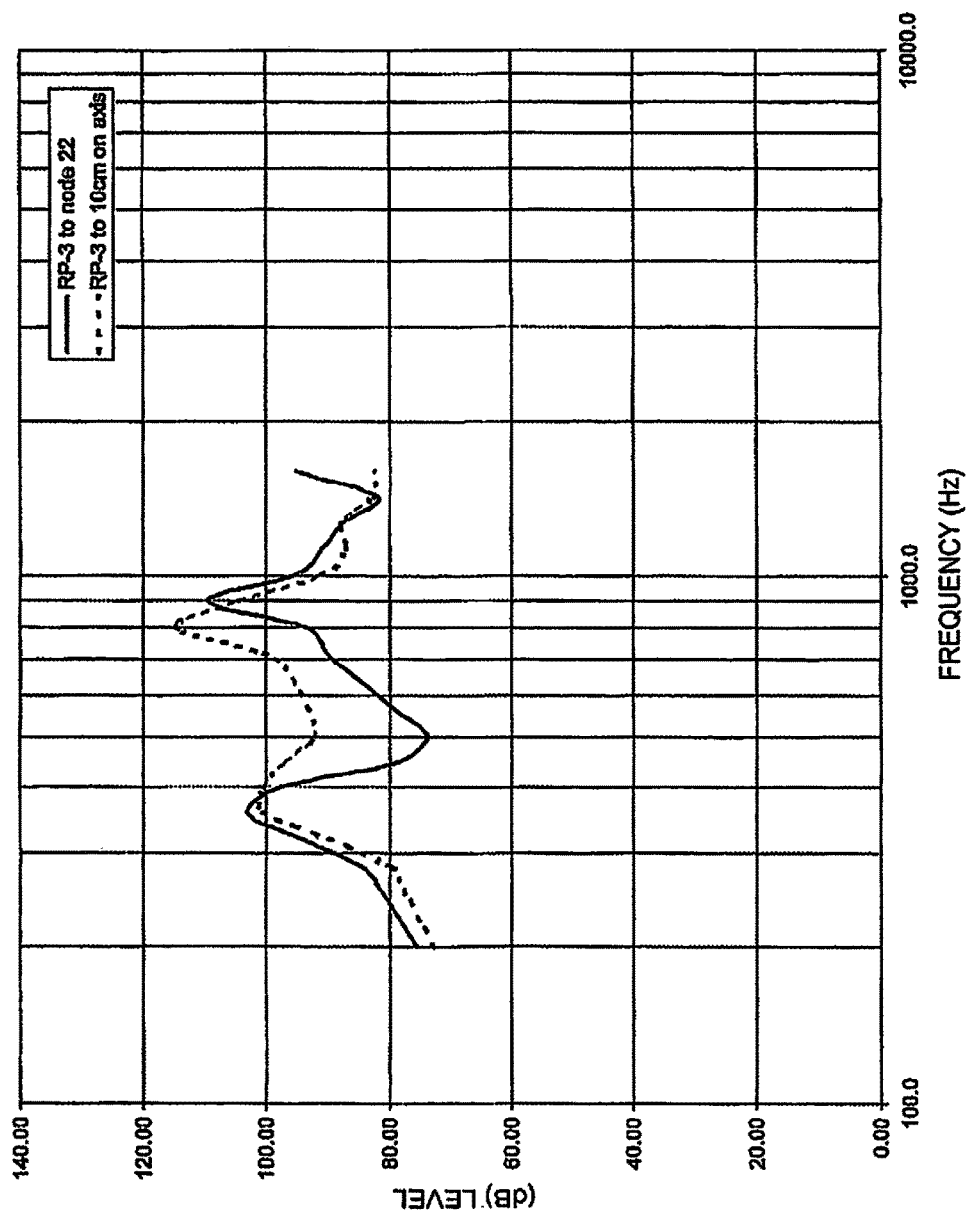
FIG. 7a is a graph of sound pressure (dB) against frequency at a point on the screen and at 10 cm on axis for a third signal.
Figure 7B:
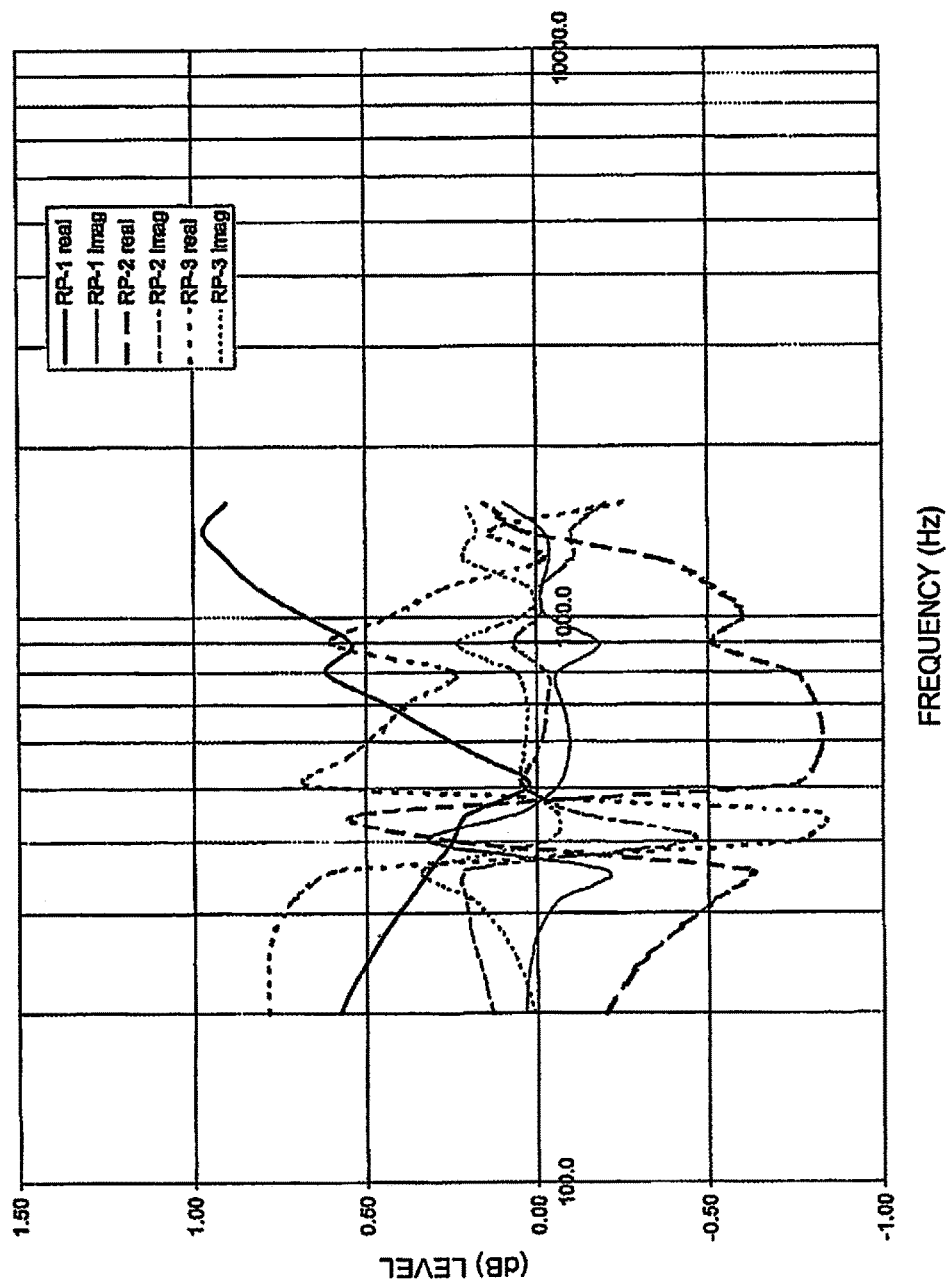
FIG. 7b is a graph showing the input spectra for each exciter for silent dual region haptics.

FIG. 7a shows the scaled sound pressure level against frequency for the signal RP-3 at node 22 and 10 cm on axis. The real (solid) and imaginary (dotted) parts of the three input spectra required to solve the silent, multi-region haptics problem are shown in FIG. 7b.

Figure 7C:
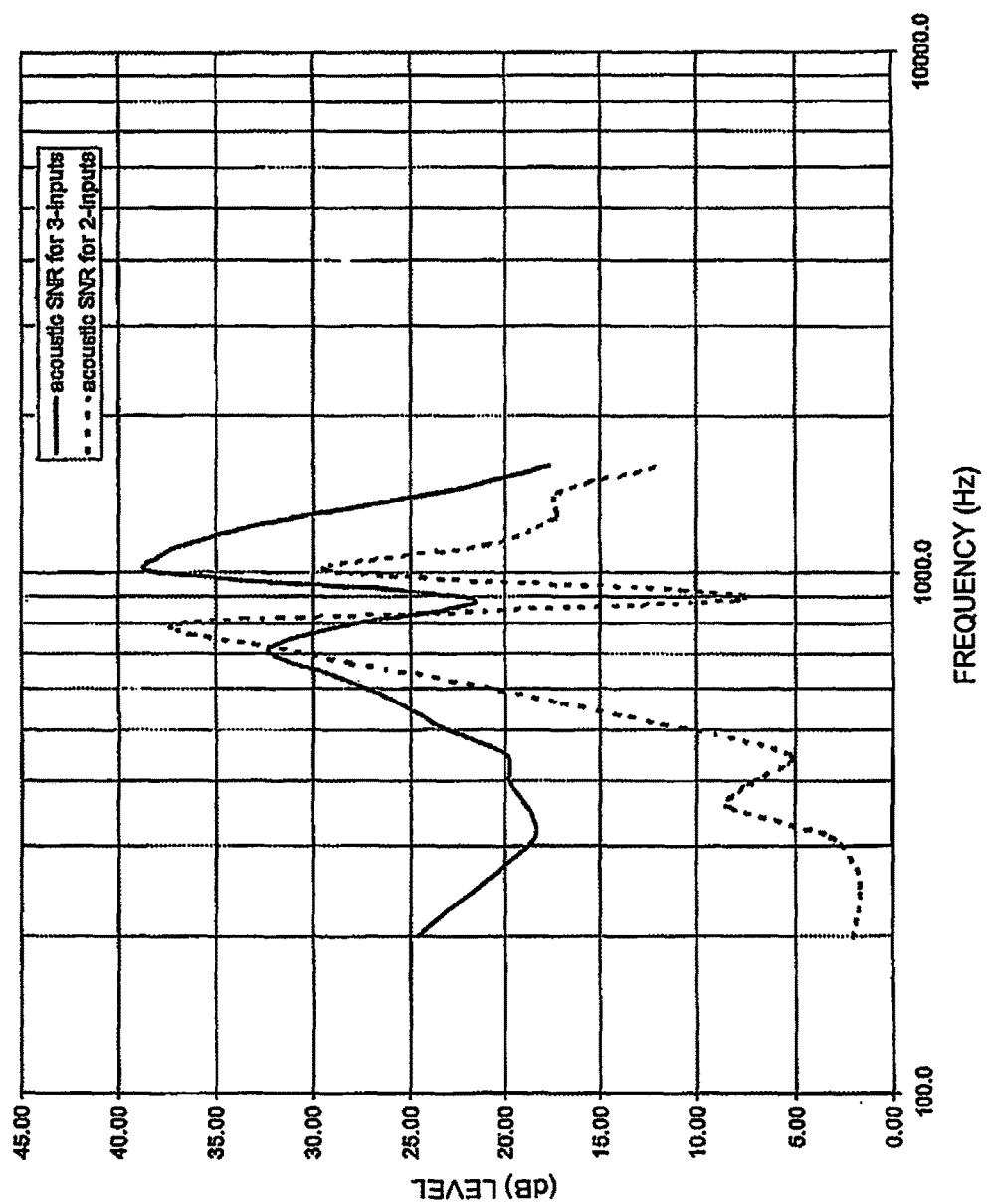
FIG. 7c compares the SNR against frequency for the input spectra of FIG. 4b and FIG. 7b.

The SNR for MR haptics provided by this solution is theoretically infinite, as the velocity at node 22 is identically zero. The effectiveness of the silent haptic part is harder to evaluate, as although the on-axis pressure is zero, there will still be acoustic radiation. Perhaps the best measure is to compare the radiated power from this solution to that from a maximum acoustics solution (found by selecting the highest eigenvalue from the acoustics-only error matrix). The estimated result of this comparison is shown in FIG. 7c, which also shows the acoustic SNR for the two-input combined optimisation described above.

With more inputs, it would be possible to introduce additional nodal points to improve the haptic response. It might also be possible to reduce the acoustic output even further, by encouraging multi-pole radiation.

Figure 8A:
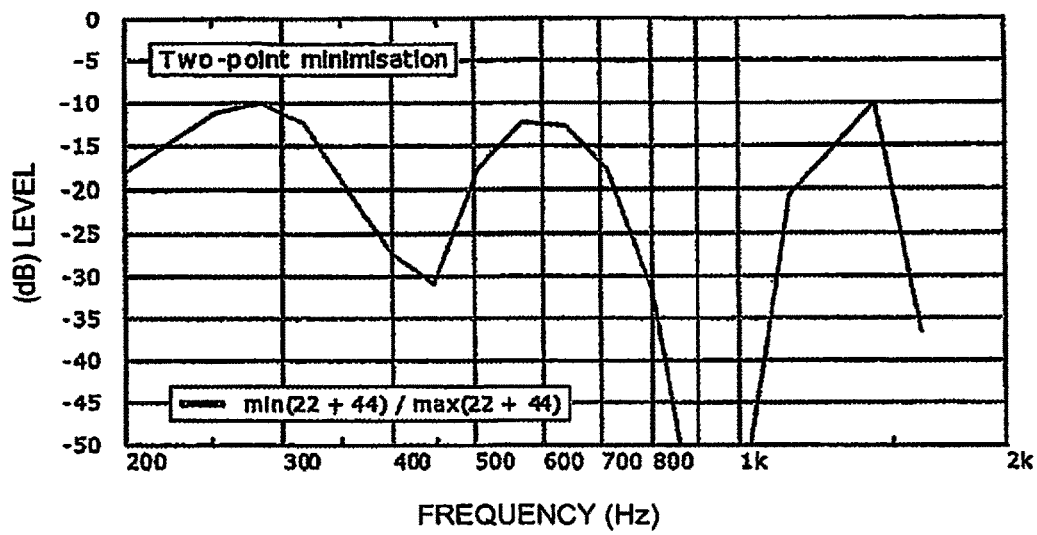
FIG. 8a plots the simultaneous reduction in velocity at two points on a touch screen using a two-point minimisation scheme.

The introduction of additional nodal points may allow the non-moving region to extend beyond the point chosen along "nodal lines". The direction and shape of the lines are frequency dependent, changing shape at each mode in the system. In order to regularize the regions kept stationary, more than one sample point must be used. In this case, the cancellation will not be as complete. For example, using both nodes 22 and 44 as targets, we may use the methods described below (e.g. tan theta) to achieve at least 10 dB separation between the maximum and minimum summed responses. This is illustrated in FIG. 8a.

Using the same analysis used to create a single nodal point, groups of nodes may be observed in order to reduce the motion along a line. If this line is naturally nodal over part of the frequency range, the method is more likely to be successful than for an arbitrary line. With only two channels, proving control over an extended area will be more difficult. For this, four or more channels will probably be needed.

Figure 8B:
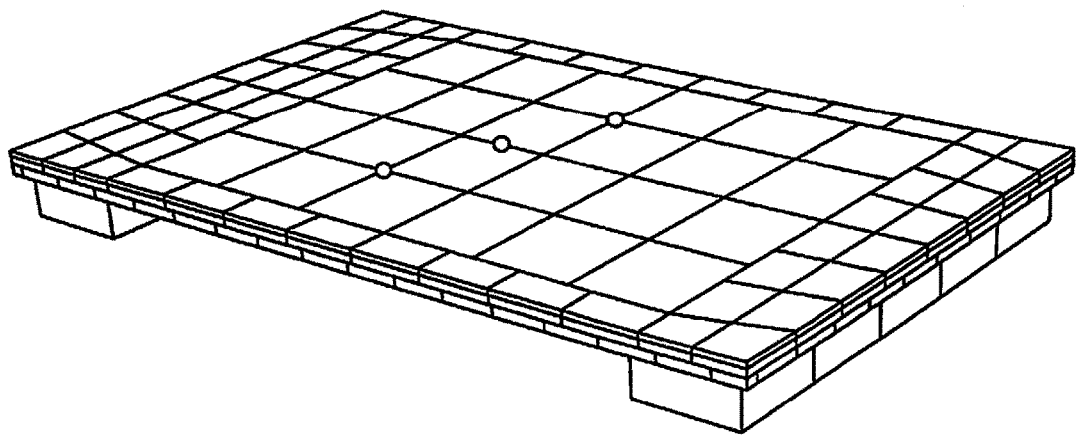
FIG. 8b shows three sampling points for a nodal line on the touch screen.
Figure 8C:
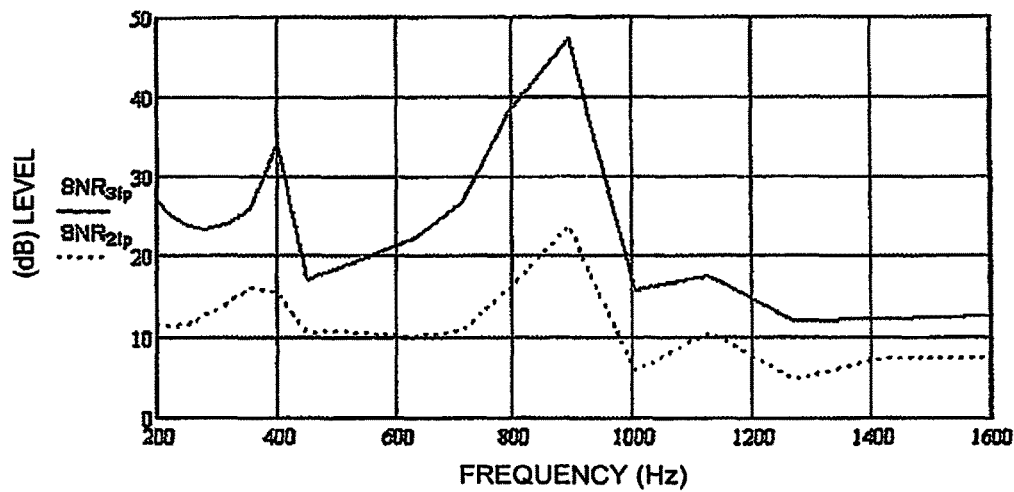
FIG. 8c plots the signal to noise ratio against frequency for the screen of FIG. 8b with results optimised for three nodes using two and three inputs, respectively.

FIG. 8b shows three example sampling points for a nodal line on a touch screen as previously described. Some differentiation between the three points is possible. At low frequencies, the line follows the nodal line at 200 Hz of the touch screen of FIG. 1a driven by the spectra of FIG. 4a. The methods described below produces two sets of inputs for the two exciters 16, 18 which result in either the minimum velocity for the three nodes or the maximum velocity for the three nodes. The ratio of these two may be considered as a "signal to noise ratio", with larger values represent a greater degree of success. This ratio (SNR) is plotted against frequency in FIG. 8c. The result is not as spectacular as that for a single node, but it is a reasonable result. The nodal line is steered away from a natural line of symmetry.

As previously described, with extra inputs it should be possible to improve the haptic response. To that end, an extra input was employed to help minimise the velocities at the set of nodes shown in FIG. 8b (the acoustic response is not considered in this exercise). The SNR for a three input is also plotted in FIG. 8c. There is a clear improvement in the SNR obtained by using the extra input. The typical improvement in SNR is 10 dB across the whole frequency range.

Figure 8D:
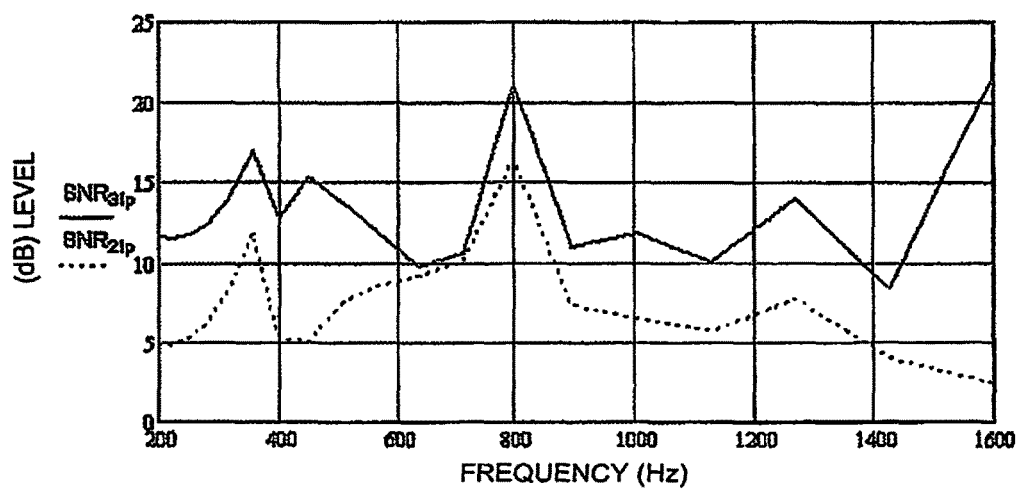
FIG. 8d plots the signal to noise ratio against frequency for the screen of FIG. 8b with results optimised for seven nodes using two and three inputs, respectively.

The process was repeated for a different set of nodes. This time the set was formed from the seven nodes running directly across the panel through node 22 described above. As shown in FIG. 8d, better results are achieved with three inputs compared to two inputs.

For any multi-region system, there are a number of inputs and a number of measurement points. The simplest case is two inputs and one target position, but as described above the problem may be considerably more complicated, involving more inputs, and extended target areas. The various methods of solving both the simple and more complex problems are described below:

A Simple Minimisation Problem & Solution by "Tan Theta" Approach

Consider a system with two inputs and one output. Let the transfer function from input 1 (e.g. the first exciter 16 in FIG.

1a) to the output be represented by P1, and the transfer function from input 2 (e.g. the second exciter 18 in FIG. 1a) to the output be represented by P2. Then, for input signals a and −b, the output signal spectrum T is given by $$T = a \cdot P1 - b \cdot P2$$

where a, b, P1, P2 and T are all complex functions of frequency.

The problem to be solved is minimising T for all frequencies. There is no unique solution to the problem, but it is clear from observation that a and b should be related; specifically $$b = a \cdot P1/P2, \text{ or } a = b \cdot P2/P1$$

Using these ratios is generally not a good idea, as either P1 or P2 may contain zeros. One simple solution is to set a=P2 and b=P1. It is also general practice to normalise the solution to unit energy, that is $|a|^2+|b|^2=1$. As P1 and P2 are in general complex quantities, the absolute values are important. Thus, T is minimised by setting:

$$a = \frac{P2}{\sqrt{|P1|^2 + |P2|^2}}, \; b = \frac{P1}{\sqrt{|P1|^2 + |P2|^2}}$$

Incidentally, T is maximised to unity by setting $$a = \frac{\overline{P1}}{\sqrt{|P1|^2 + |P2|^2}}, \; b = -\frac{\overline{P2}}{\sqrt{|P1|^2 + |P2|^2}}$$

If P1 or P2 are measured remote from the input, as is generally the case in acoustics, the transfer function will include excess phase in the form of delay. Consequently, these values of a and b may not be the best choice. If we set $a=\cos(\theta)$ and $b=\sin(\theta)$, then $\tan(\theta)=P1/P2$. This solution may be described as the "tan theta" solution and produces a and b with much less excess phase. It is clear that $a^2+b^2=1$ due to the trigonometric identity, but as θ is in general complex, $|a|^2+|b|^2 \neq 1$, so normalisation would still be required.

In this simple example, the minimisation problem was solved by inspection. As this may not be possible in general, it would be of advantage to have a systematic method of finding the solution.

Variational Methods

The minimisation of energy functions is a key process in many branches of physical modelling with mathematics, and for example forms the foundation of finite element analysis. The task at hand is to determine values of parameters that lead to stationary values to a function (i.e. to find nodal points, lines or pressures). The first step of the process is forming the energy function. For our example, the squared modulus of T may be used, i.e. $E=|T|^2=|a \cdot P1-b \cdot P2|^2$. The stationery values occur at the maximum and the minimum of E.

$$E = (a \cdot P1 - b \cdot P2) \cdot \overline{(a \cdot P1 - b \cdot P2)}$$

There is a constraint on the values of a and b—they cannot both be zero. This constraint may be expressed using a so called "Lagrange multiplier" to modify the energy equation, thus;

$$E = (a \cdot P1 - b \cdot P2) \cdot \overline{(a \cdot P1 - b \cdot P2)} + \lambda \cdot (\bar{a} \cdot a + \bar{b} \cdot b - 1)$$

It is common in these types of problem to consider the complex conjugate of each variable as an independent variable. We shall follow the practice here, and differentiate E with respect to each conjugate variable in turn, thus;

$$\frac{\partial E}{\partial \bar{a}} = (a \cdot P1 - b \cdot P2) \cdot \overline{P1} + \lambda \cdot a \quad (1)$$

$$\frac{\partial E}{\partial \bar{b}} = -(a \cdot P1 - b \cdot P2) \cdot \overline{P2} + \lambda \cdot b \quad (2)$$

At the stationary points, both of these must be zero. It is possible to see straight away that the solutions found in the previous section apply here too. However, continuing to solve the system of equations formally, first the equations are combined to eliminate λ by finding:

$$(1) \cdot b - (2) \cdot a$$

$$(a \cdot P1 - b \cdot P2) \cdot \overline{P1} \cdot b + (a \cdot P1 - b \cdot P2) \cdot \overline{P2} \cdot a = 0$$

The resulting equation is quadratic in a and b, the two solutions corresponding to the maximum and the minimum values of E. Introducing $a=\cos(\theta)$ and $b=\sin(\theta)$—although strictly speaking this does not satisfy the Lagrange constraint—obtains a quadratic equation in $\tan(\theta)$.

$$P1 \cdot \overline{P2} + (|P1|^2 - |P2|^2) \cdot \tan(\theta) - P2 \cdot \overline{P1} \cdot \tan(\theta)^2 = 0$$

Noting that in many cases, $(|P1|^2-|P2|^2)^2+4 \cdot P1 \cdot \overline{P2} \cdot P2 \cdot \overline{P1} = (|P1|^2+|P2|^2)^2$, we arrive at the same answers as before, namely $$\theta = \arctan\left(\frac{P1}{P2}\right)$$

for the minimum, and $$\theta = \overline{\arctan\left(-\frac{P2}{P1}\right)}$$

for the maximum.

For completeness, it is noted that this identity might not apply in the general case, where P1 and P2 are sums or integrals of responses. Nevertheless, it is possible to systematically find both stationary values using this variation of the "tan theta" approach. One application is explained in more detail below to illustrate how these solutions may be used in the examples described above.

Application 1: Silent Haptic.

In the case where everything is completely symmetrical, the silent haptic problem is trivial—a and b are set to equal values. When there is asymmetry in the system, this assumption is no longer valid. The problem to solve is to find two sets of input values a and b which give maximum output for audio and minimum output for silent haptics. This is exactly the problem solved in the "variational methods" section.

Figure 9A:
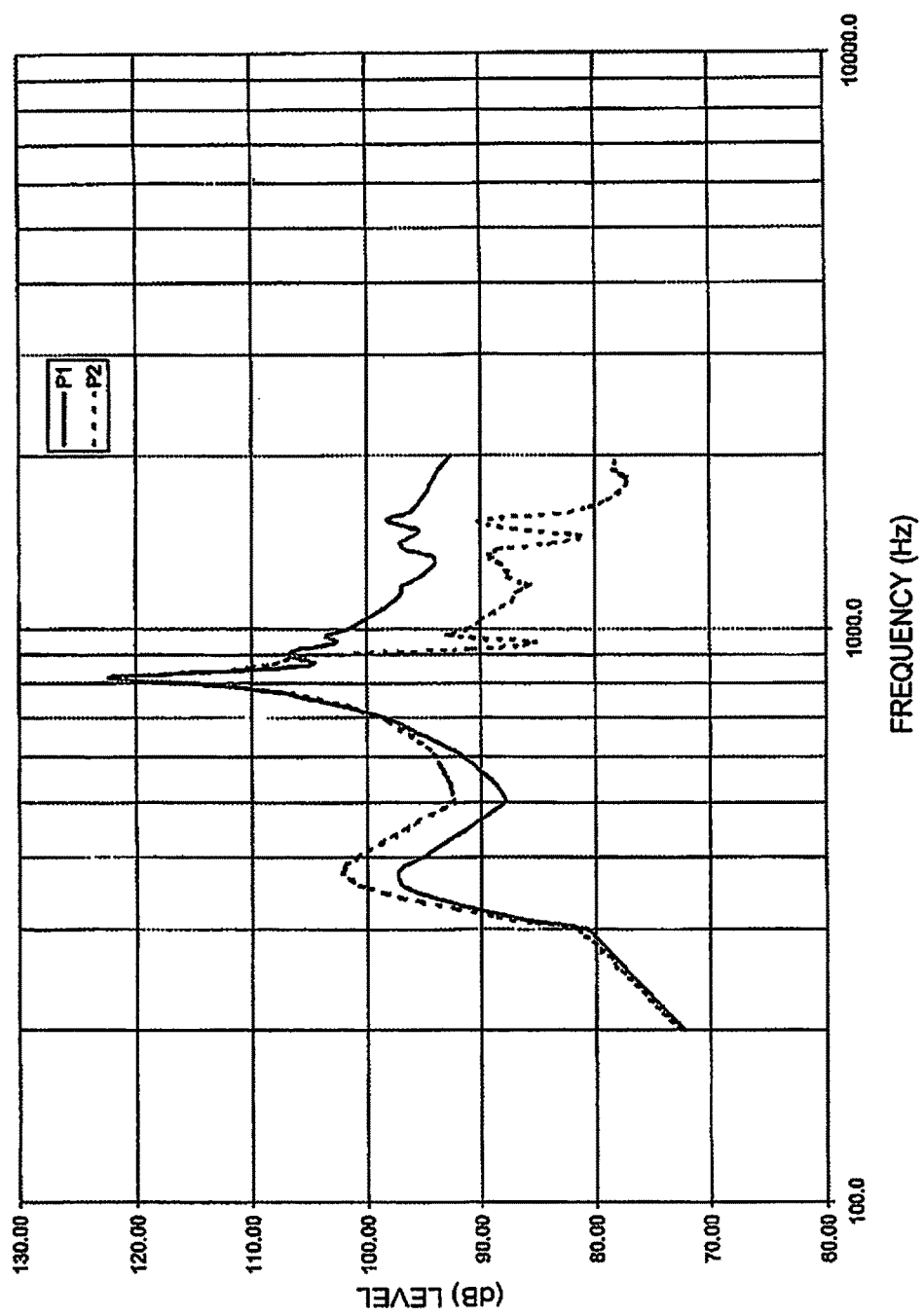
FIG. 9a shows the axial sound pressure level against frequency for each channel in a system having asymmetry.

P1 and P2, shown in FIG. 9a as dB SPL, are the acoustic responses at 10 cm, obtained in this case by finite element simulation—they could equally well have been obtained by measurement. The pressure levels result from simulating a DMA with a nominal 1N force plus some frequency dependence. (A typical DMA would have a nominal force of, say, 15-30 mN/V. The SPL levels in the figure are thus higher than would be achieved with a real DMA.)

Figure 9B:
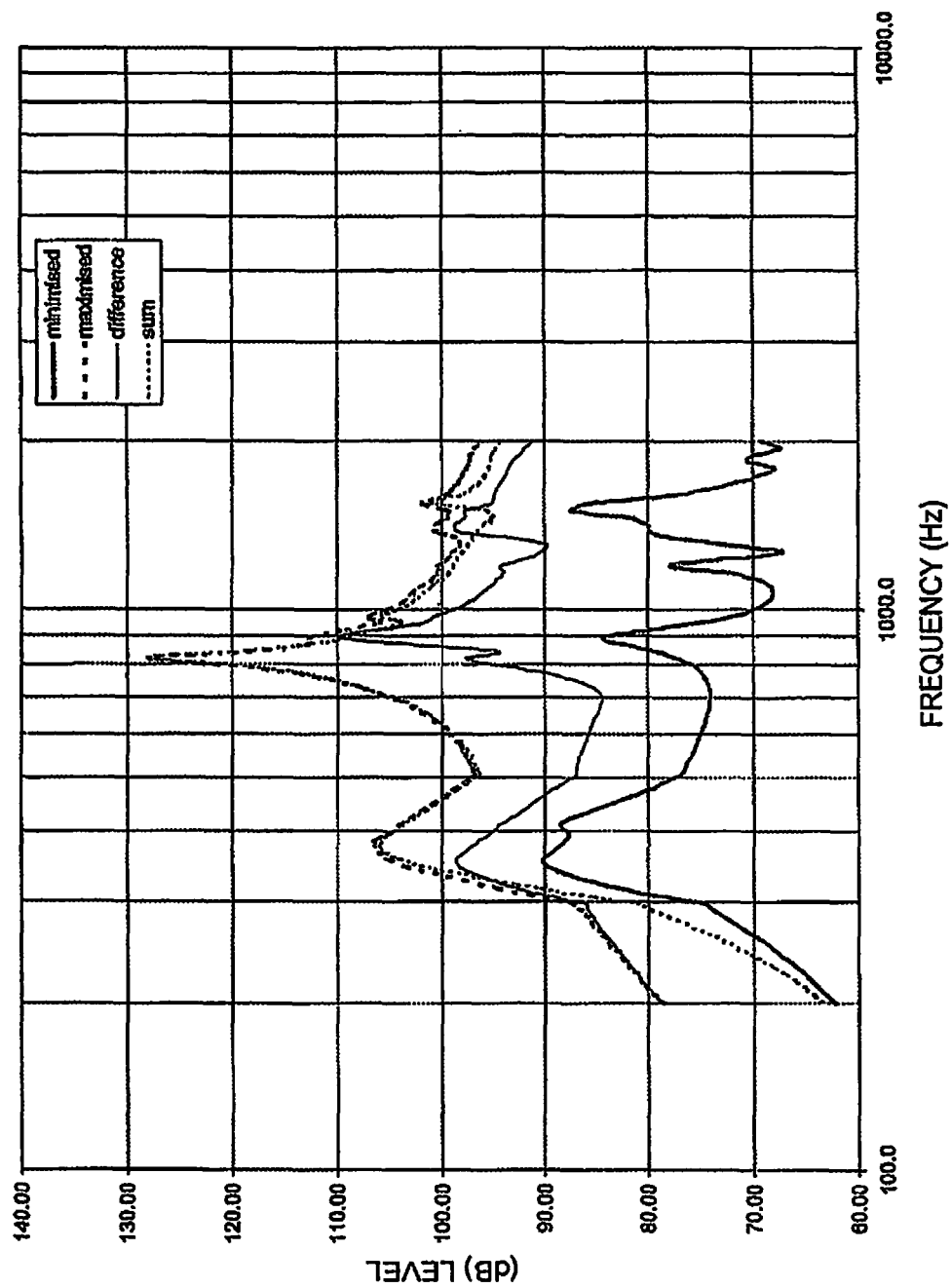
FIG. 9b shows the rms averaged sound pressure levels against frequency for combined channels and optimised channels with normalised input levels.

The result from using an optimal filter pair (max and min, according to the two solutions for θ), is compared with the simple sum and difference pair in FIG. 9b. The summed response is higher than the subtracted response over much of the band, it is not always so. Although the on-axis response does not tell the whole story, the averaged results over the front hemisphere would show similar features.

Figure 9C:
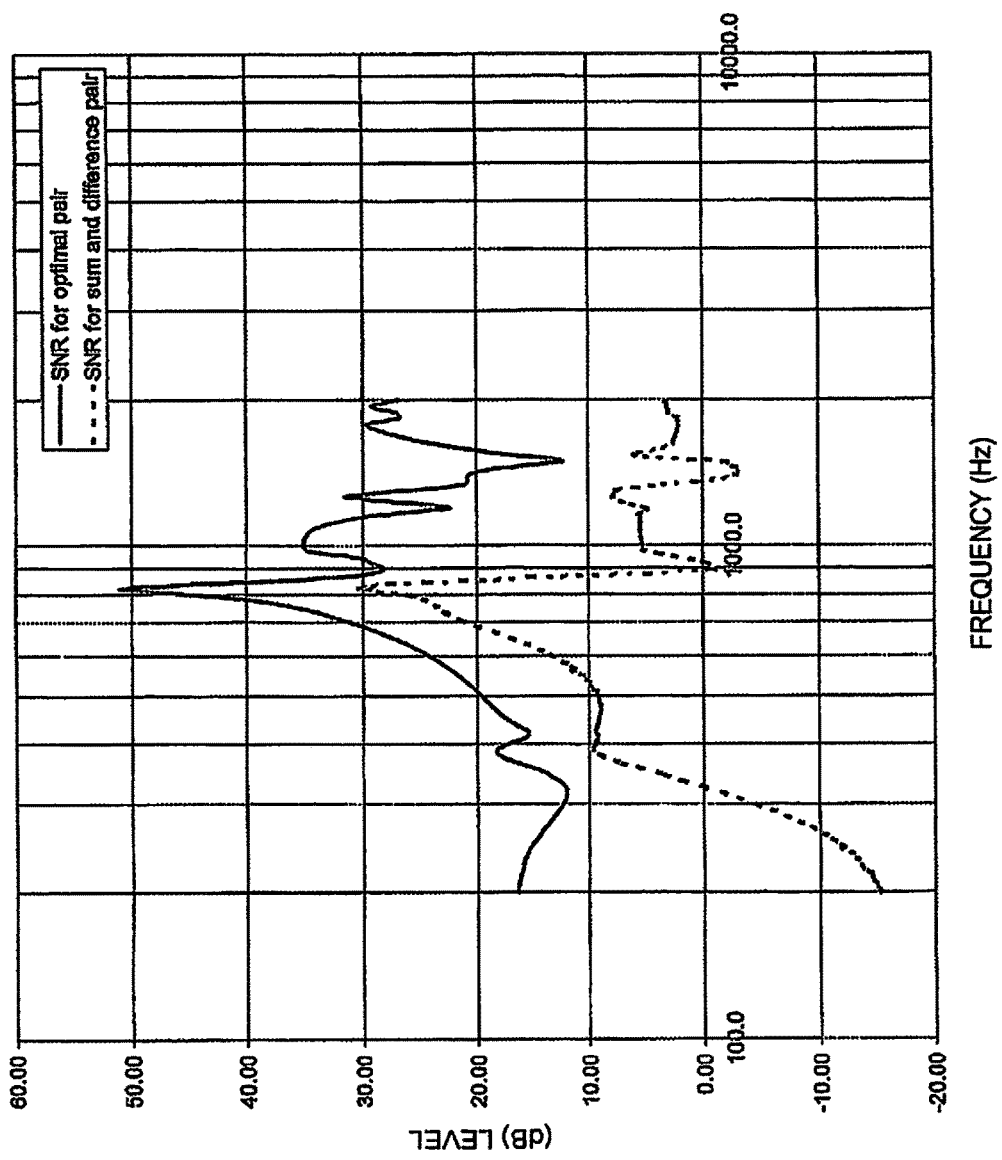
FIG. 9c shows the signal to noise ration for the signals shown in FIG. 9b.

As a result of the optimization procedure, there is a wanted signal (the maximum) and an unwanted signal (the minimum). The ratio of the two may be described as a "signal to noise ratio", or "SNR". This is usually expressed in dB, and large values are better than small values. FIG. 9c shows clearly how the optimized signal pair maximizes the SNR at every frequency, giving improvements of 10-20 dB over the full spectral range. Notice that with the standard sum and difference pair, the SNR is actually negative below about 330 Hz. Accordingly, applying the techniques descried above to the silent haptic problem in a system with asymmetry, results in improvements in the signal to noise ratio of many dB compared to the simple sum and difference solution which is appropriate for symmetrical systems. In an embodiment the vibration exciters are positioned on the panel to encourage anti-symmetric modes.

The solution described above may be applied to extended areas as described in relation to FIG. 8b by measuring the target at a number of discrete sampling points. In this case, it is desirable to simultaneously minimize the outputs by manipulating the inputs. There are now more output signals than input signals, so the result is not exact. This is one of the strengths of the variational method—it can find the best approximation.

$$\sum_i T_i = \sum_i |a \cdot P1_i - b \cdot P2_i|^2 = \sum_i (a \cdot P1_i - b \cdot P2_i) \cdot \overline{(a \cdot P1_i - b \cdot P2_i)}$$

$$E = \sum_i (a \cdot P1_i - b \cdot P2_i) \cdot \overline{(a \cdot P1_i - b \cdot P2_i)} + \lambda \cdot (\overline{a} \cdot a + \overline{b} \cdot b - 1)$$

$$\frac{\partial E}{\partial \overline{a}} = \sum_i (a \cdot P1_i - b \cdot P2_i) \cdot \overline{P1_i} + \lambda \cdot a$$

$$\frac{\partial E}{\partial \overline{b}} = -\sum_i (a \cdot P1_i - b \cdot P2_i) \cdot \overline{P2_i} + \lambda \cdot b.$$

Solving these as before yields $$S12 + (S11 - S22) \cdot \tan(\theta) - S21 \cdot \tan(\theta)^2 = 0$$

where $$Snm = \sum_i Pn_i \cdot \overline{Pm_i}$$

$$\theta m = \arctan\left(\frac{S11 - S22 + \sqrt{(S11 - S22)^2 + 4 \cdot S12 \cdot S21}}{2 \cdot S21}\right),$$

gives the minimum $$\theta p = \arctan\left(\frac{S11 - S22 - \sqrt{(S11 - S22)^2 + 4 \cdot S12 \cdot S21}}{2 \cdot S21}\right),$$

gives the maximum

The method extends similarly to integrals, and to more than two inputs.

For example, the error function and the sums may be replaced with integrals;

$$E = \oiint |a \cdot P1(\underline{r}) - b \cdot P2(\underline{r})|^2 dA + \lambda \cdot (\overline{a} \cdot a + \overline{b} \cdot b - 1)$$

$$Snm = \oiint Pn(\underline{r}) \cdot \overline{Pm(\underline{r})} dA$$

Application 2: Dual Region Haptics

It is possible to simultaneously specify a minimal response at an elected response and a non-zero response at another elected position. This might be very useful in dual region systems.

"Strong" Solution.

We have two inputs (for example), to produce one nodal point and haptic feedback at another point. Define transfer functions Pi_j from input i to output j.

Simultaneously solve $a \cdot P1\_1 + b \cdot P2\_1 = 0$ and $a \cdot P2\_1 + b \cdot P2\_2 = g$.

$$\begin{pmatrix} P1\_1 & P2\_1 \\ P1\_2 & P2\_2 \end{pmatrix} \begin{pmatrix} a \\ b \end{pmatrix} = \begin{pmatrix} 0 \\ g \end{pmatrix}, \begin{pmatrix} a \\ b \end{pmatrix} = \begin{pmatrix} P1\_1 & P2\_1 \\ P1\_2 & P2\_2 \end{pmatrix}^{-1} \begin{pmatrix} 0 \\ g \end{pmatrix}$$

$$a = -\frac{P2\_1}{P1\_1 \cdot P2\_2 - P1\_2 \cdot P2\_1} \cdot g,$$

$$b = \frac{P1\_1}{P1\_1 \cdot P2\_2 - P1\_2 \cdot P2\_1} \cdot g$$

Provided the denominator is never zero, this pair of transfer functions will produce a nodal response at point 1, and a complex transfer function exactly equal to g at point 2.

"Weak" Solution

Simultaneously solve $|a \cdot P1\_1 + b \cdot P2\_1|^2 = 0$ and $|a \cdot P2\_1 + b \cdot P2\_2|^2 = |g|^2$.

Use the variational methods discussed below to solve the first minimisation for a and b, and the normalise the result to satisfy the second equation.

$$a = r \cdot \cos(\theta), b = -r \cdot \sin(\theta), \tan(\theta) = -\frac{P1\_1}{P1\_2}$$

$$r^2 \cdot |(\cos(\theta) \cdot P2\_1 - \sin(\theta) \cdot P2\_2)|^2 = |g|^2, \text{hense } r.$$

Provided the denominator is never zero, this pair of transfer functions will produce a nodal response at point 1, and a power transfer function equal to $|g|^2$ at point 2. The resulting output at point 2 will not necessary have the same phase response as g, so the coercion is not as strong.

There are other extensions to the methods described above that are particularly relevant when considering more than two input channels. These extensions are general, and would equally well apply to the two-channel case. Additionally, by using eigenvalue analysis as a tool, we get the "best" solution when no exact solution is available.

Relationship Between the Variational Method and the Eigenvalue Problem.

When minimising an energy function of the form E, below, we arrive at a set of simultaneous equations;

$$E = \left|\sum_n a_n \cdot P_n\right|^2, \frac{\partial E}{\partial \overline{a_n}} = \overline{P_n} \cdot \sum_n a_n \cdot P_n = 0, \text{ for all } n$$

where $P_i$ are the inputs to the system and $a_i$ the constants applied to these inputs, i.e. a and b in the previous two channel system.

We may write this system of equations in matrix form, thus $$\underline{M} \cdot \underline{v} = 0, \text{ where } \underline{M}_{i,j} = \overline{P_i} \cdot P_j, \text{ and where } \underline{v}_j = a_j. \quad (1)$$

Note that M is conjugate symmetric, i.e. $\underline{M}_{j,i} = \overline{\underline{M}_{i,j}}$ We wish to find a non-trivial solution; that is a solution other than the trivial v=0, which although mathematically valid, is not of much use.

As any linear scaling of v is also a solution to the equation, the $a_i$ are not uniquely defined. We need an additional equation to constrain the scaling. Another way of viewing things is to say that for an exact solution, the number of input variables must be greater then the number of measurement points. Either way, there is one more equation than free variables, so the determinant of M will be zero.

Consider the matrix eigenvalue problem, where we wish to find a non-trivial solution to the equation $$\underline{M} \cdot \underline{v} - \lambda \cdot \underline{v} = 0, \text{ where } \lambda \text{ is an eigenvalue, and the associated } \underline{v} \text{ is the eigenvector.} \quad (2)$$

As M is conjugate symmetric, all the eigenvalues will be real and non-negative. If $\lambda=0$ is a solution to the eigenvalue problem, it should be clear that we have our original equation. So v is the eigenvector for $\lambda=0$.

What is particularly powerful about this method, is that even when there is no solution to (1), the solution to (2) with the smallest value of $\lambda$ is the closest approximate answer.

For example, using the problem posed above:

$$\begin{pmatrix} \overline{P1} \cdot P1 & -\overline{P1} \cdot P2 \\ -\overline{P2} \cdot P1 & \overline{P2} \cdot P2 \end{pmatrix} \cdot \begin{pmatrix} a \\ b \end{pmatrix} - \lambda \cdot \begin{pmatrix} a \\ b \end{pmatrix} = 0,$$

has a solution $\lambda=0$, b/a=P1/P2.

The other eigenvalue corresponds to the maximum; $\lambda=|P1|^2+|P2|^2$, b/a$=-\overline{P2/P1}$ When using an eigenvalue solver to find the values of $a_i$, the scaling used is essentially arbitrary. It is normal practice to normalise the eigenvector, and doing so will set the amplitudes;

$$\sum_i |a_i|^2 = 1$$

For example, $$a = \frac{P2}{\sqrt{|P1|^2 + |P2|^2}}, b = \frac{P1}{\sqrt{|P1|^2 + |P2|^2}}$$

The reference phase, however, is still arbitrary—if v is a normalised solution to the eigen-problem, then so is $v \cdot e^{j\theta}$. What constitutes the "best" value for $\theta$, and how to find it is the subject of a later section.

The value of the eigenvalue $\lambda$ is just the energy associated with that choice of eigenvector. The proof follows;

$$E = \left| \sum_n a_n \cdot P_n \right|^2 = \sum_n a_n \cdot P_n \cdot \sum_m \overline{a_m} \cdot \overline{P_m} =$$

-continued $$\sum_m \overline{a_m} \cdot \left( \sum_n \overline{P_m} \cdot P_n \cdot a_n \right) = \sum_m \overline{a_m} \cdot \left( \sum_n M_{mn} \cdot a_n \right)$$

From our eigenvalue equation and normalisation of the eigenvector, we can continue by stating $$E = \sum_m \overline{a_m} \cdot \left( \sum_n M_{mn} \cdot a_n \right) = \sum_m \overline{a_m} \cdot (\lambda \cdot a_m) = \lambda \cdot \sum_m \overline{a_m} \cdot a_m = \lambda$$

Solving the Eigenvalue Problem

In principle, a system of order n has n eigenvalues, which are found by solving an nth order polynomial equation. However, we don't need all the eigenvalues—only the smallest.

$$\underline{M} \cdot \underline{v} - \lambda \cdot \underline{v} = 0, \text{ leads to } |M - \lambda \cdot I| = 0, \text{ leads to } \prod_{i=1}^n (\lambda - \lambda_i) = 0$$

If there is an exact solution to the problem, the determinant will have $\lambda$ as a factor. For example, $$\left| \begin{pmatrix} a & b \\ \overline{b} & c \end{pmatrix} - \lambda \cdot \begin{pmatrix} 1 & 0 \\ 0 & 1 \end{pmatrix} \right| = \left| \begin{pmatrix} a-\lambda & b \\ \overline{b} & c-\lambda \end{pmatrix} \right| = (a-\lambda)(c-\lambda) - |b|^2 = 0$$

$$a \cdot c - |b|^2 - (a+c) \cdot \lambda + \lambda^2 = 0$$

If $a \cdot c - |b|^2 = 0$, then there is an exact solution.

As the number of equations is greater than the number of unknowns, there are more than one possible sets of solutions to v, but they are all equivalent;

$$(a - \lambda) \cdot v_0 + b \cdot v_1 = 0, \frac{v_1}{v_0} = \frac{\lambda - a}{b}$$

$$\overline{b} \cdot v_0 + (c - \lambda) \cdot v_1 = 0, \frac{v_1}{v_0} = \frac{\overline{b}}{\lambda - c}$$

For example a=2, b=1+1j, c=3; 6−2−5·$\lambda$+$\lambda^2$=0; $\lambda$=1,4

($\lambda$−2)/(1+1j)=(−1+1j)/2 or 1−1j (1−1j)/($\lambda$−3)=(−1+1j)/2 or 1−1j

So the best solution to the pair of equations is given by v1/v0=(−1+1j)/2

Choosing the "Best" Scaling for the Solution

Mathematically speaking, any solution to the problem is as good as any other. However we are trying to solve an engineering problem. Both the matrix, M, and its eigenvectors, v, are functions of frequency. We wish to use the components of v as transfer functions, so having sudden changes of sign or phase is not preferred.

$$\underline{M}(\omega) \cdot \underline{v}(\omega) = 0$$

For the two-variable problem, we used the substitution a=cos($\theta$) and b=sin($\theta$), and the solved for tan($\theta$). This method seems to produce values of a and b with low excess phase. However, using this method quickly becomes unwieldy, as the equations get more and more complicated to form, never mind solve. For example, for 3 variables we have 2 angles and can use the spherical polar mapping to give a=cos(θ)·cos(φ), b=cos(θ)·sin(φ), c=sin(θ).

Instead, let us use the variational method to determine the "best" value for θ. We will define best to mean having the smallest total imaginary component.

Now, let $v'=v \cdot e^{j\theta}$, let v=vr+j·vi, and define our error energy as $$SSE = \sum_i \text{Im}(v'_i)^2 = \sum_i \text{Im}((vr_i + j \cdot vi_i) \cdot (\cos(\theta) + j \cdot \sin(\theta)))^2 = \sum_i (vi_i \cdot \cos(\theta) + vr_i \cdot \sin(\theta))^2$$

Let $rr=\text{Re}(v)\cdot\text{Re}(v)=\Sigma vr_i^2$, $ii=\text{Im}(v)\cdot\text{Im}(v)=\Sigma vi_i^2$, $ri=\text{Re}(v)\cdot\text{Im}(v)=\Sigma vr_i \cdot vr_i$ Then SSE=cos(θ)²·ii+2·cos(θ)·sin(θ)·ri+sin(θ)²·rr (For θ=0, SSE=ii, which is our initial cost. We want to reduce this, if possible).

Now differentiate with respect to θ to give our equation

2·(cos(θ)²−sin(θ)²)·ri+2·cos(θ)·sin(θ)·(rr−ii)=0

Dividing through by 2·cos(θ)², we get the following quadratic in tan(θ);

ri+tan(θ)·(rr−ii)−tan(θ)²·ri=0

Of the two solutions, the one that gives the minimum of SSE is $$\tan(\theta) = \frac{rr - ii - \sqrt{(rr-ii)^2 + 4 \cdot ri^2}}{2 \cdot ri}$$

If ri=0, then we have two special cases;
If ri=0 and rr>=ii, then θ=0.
If ri=0 and rr<ii, then θ=π/2.

The final step in choosing the best value for v is to make sure that the real part of the first component is positive (any component could be used for this purpose), i.e.
Step 1. $v'=v\cdot e^{j\theta}$
Step 2 if $v'_0<0$, $v'=-v'$ Example $$v = \begin{pmatrix} 0.908 - 0.419j \\ 0.770 - 0.638j \\ 0.9999 - 0.01j \\ 0.343 - 0.939j \end{pmatrix},$$

rr=2.534, ii=1.466, ri=−1.204; solving gives θ=0.577

$$v' = \begin{pmatrix} 0.990 + 0.143j \\ 0.993 - 0.115j \\ 0.844 + 0.537j \\ 0.800 - 0.600j \end{pmatrix}$$

rr'=3.318, ii'=0.682, ri=0

Note that minimising ii simultaneously maximises rr and sets ri to zero.

Comparison of Techniques—a Worked Example

Consider a two-input device with two outputs (i.e. the device described above). There will be exact solutions for minimising each output individually, but only an approximate solution to simultaneous minimisation.

Output 1 transfer admittances: P1_1=0.472+0.00344j, P2_1=0.479−0.129j

Output 2 transfer admittances: P1_2=−0.206−0.195j, P2_2=0.262+0.000274j

Form two error contribution matrices $$M1 = \begin{pmatrix} 0.223 & 0.226 - 0.063j \\ 0.226 + 0.063j & 0.246 \end{pmatrix};$$

|M1|=0, i.e. exact solution possible $$M2 = \begin{pmatrix} 0.080 & -0.054 + 0.050j \\ -0.054 - 0.050j & 0.069 \end{pmatrix};$$

|M2|=0, i.e. exact solution possible $$M1 + M2 = \begin{pmatrix} 0.303 & 0.171 - 0.012j \\ 0.171 + 0.012j & 0.315 \end{pmatrix};$$

|M1+M2|=0.066

We now use the "tan theta" method to solve the three cases.

$$\begin{pmatrix} a \\ b \end{pmatrix}_1 = \begin{pmatrix} 0.718 - 0.093j \\ -0.682 - 0.098j \end{pmatrix},$$

$$\begin{pmatrix} a \\ b \end{pmatrix}_2 = \begin{pmatrix} 0.623 - 0.270j \\ 0.692 + 0.244j \end{pmatrix},$$

$$\begin{pmatrix} a \\ b \end{pmatrix}_{1+2} = \begin{pmatrix} 0.719 - 0.024j \\ -0.694 - 0.025j \end{pmatrix}$$

Now for the eigenvector method. I have two eigenvector solvers; one solves for all vectors simultaneously, and the other solves for a specific eigenvalue. They give numerically different answers when the vectors are complex (both answers are correct), but after applying the "best" scaling algorithm, both solvers give the same results as those above.

M1: eigenvalues, 0 and 0.469:
Eigenvector before scaling: (−0.698+0.195j, 0.689−0.0013j) or (0.724, −0.664−0.184j)
Eigenvector after scaling: (0.718−0.093j, −0.682−0.098j)
M2: eigenvalues, 0 and 0.149:
Eigenvector before scaling: (−0.5+0.46j, 0.734−0.0030j) or (0.498−0.462j, 0.724)
Eigenvector after scaling: (0.623−0.270j, 0.692+0.244j)
M1+M2: eigenvalues, 0.137 and 0.480:
Eigenvector before scaling: (−0.717+0.051j, 0.695−0.0007j) or (0.719, −0.693−0.049j)
Eigenvector after scaling: (0.719−0.024j, −0.694−0.025j)
Adding a 3$^{rd}$ Input Now consider the contributions from a third input channel.
Output 1 transfer admittance: P3_1=−0.067−0.180j
Output 2 transfer admittance: P3_2=0.264+0.0014j
Add these contributions to the error matrices $$M1 = \begin{pmatrix} 0.223 & 0.226 - 0.063j & -0.032 - 0.085j \\ 0.226 + 0.063j & 0.246 & -0.009 - 0.095j \\ -0.032 + 0.085j & -0.009 + 0.095j & 0.037 \end{pmatrix};$$

$$|M1| = 0$$

$$M2 = \begin{pmatrix} 0.080 & -0.054 + 0.050j & -0.055 + 0.051j \\ -0.054 - 0.050j & 0.069 & 0.069 - 0.0004j \\ -0.055 - 0.051j & 0.069 + 0.0004j & 0.070 \end{pmatrix};$$

$$|M2| = 0$$

$$M1 + M2 = \begin{pmatrix} 0.303 & 0.171 - 0.012j & -0.087 - 0.034j \\ 0.171 + 0.012j & 0.315 & 0.061 - 0.095j \\ -0.087 + 0.034j & 0.061 + 0.095j & 0.107 \end{pmatrix};$$

$$|M1 + M2| = 0$$

Now there is an exact solution to the joint problem, and M1+M2 has a zero eigenvalue.

(Note that M1 and M2 individually have two zero eigenvalues each—in other words they have a degenerate eigenvalue. There are two completely orthogonal solutions to the problem, and any linear sum of these two solutions is also a solution).

M1+M2: eigenvalues are 0, 0.218 and 0.506:
Eigenvector after scaling: (0.434−0.011j, −0.418+0.199j, 0.764+0.115j)

As illustrated above, for two inputs, the "tan theta" method is quicker and simpler to implement, however for three or four inputs the "scaled eigenvector" method is easier. Both methods produce the same result. For an exact solution, the number of input variables must be greater than the number of measurement points. By using eigenvalue analysis as a tool for the general problem, we get the "best" solution when no exact solution is available.

For the general 'm' input, 'n' output minimisation problem there are two principle variations on an algorithm to find the best m inputs. These may be referred to as the parallel "all at once" method and the serial "one at a time" method. In general, these may be combined at will. If m>n, then all routes end up with the same, exact answer (within rounding errors). If m<=n, then there are only approximate answers, and the route taken will affect the final outcome. The serial method is useful if m<=n, and some of the n outputs are more important than others. The important outputs are solved exactly, and those remaining get a best fit solution.

The Parallel, "all at Once" Algorithm

Figure 10A:
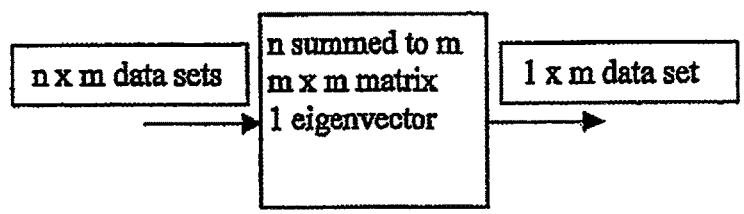
FIG. 10a is a block diagram of a parallel solver.

FIG. 10a is a block diagram of a parallel solver. One error matrix is formed, and the eigenvector corresponding to the lowest eigenvalue is chosen. If m>n, then the eigenvalue will be zero, and the result exact.

The Recursive or Sequential, "One at a Time" Algorithm

Figure 10B:
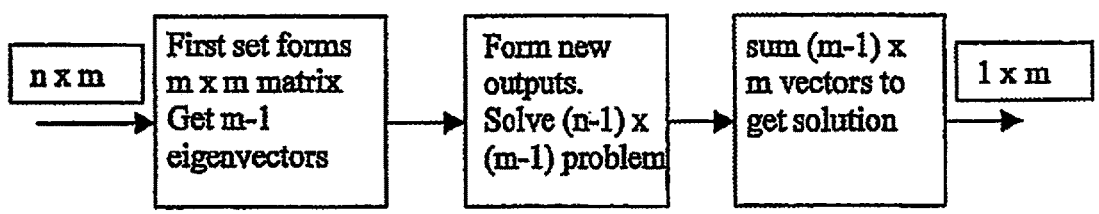
FIG. 10b is a block diagram of a recursive solver, and
FIG. 10c compares the velocity reduction performance for the solutions of FIGS. 10a and 10b.

FIG. 10b is a block diagram of a recursive solver. An error matrix for the most important output is formed, and the eigenvectors corresponding to the (m−1) lowest eigenvalues are formed. These are used as new input vectors, and the process is repeated. The process ends with a 2×2 eigenvalue solution. Backtracking then reassembles the solution to the original problem.

As with all recursive algorithms, this process could be turned into an iterative (or sequential) process. For the first m−2 cycles, all the outputs have exact solutions. For the remaining cycle, the best linear combination of these solutions is found to minimise the remaining errors.

Example 1: m=3, n=2

Output 1 transfer admittances: P1_1=0.472+0.00344j
Output 2 transfer admittances: P1_2=−0.206−0.195j
Output 1 transfer admittances: P2_1=0.479−0.129j
Output 2 transfer admittances: P2_2=0.262+0.000274j
Output 1 transfer admittance: P3_1=−0.067−0.180j
Output 2 transfer admittance: P3_2=0.264+0.0014j
All at Once $$M1 + M2 = \begin{pmatrix} 0.303 & 0.171 - 0.012j & -0.087 - 0.034j \\ 0.171 + 0.012j & 0.315 & 0.061 - 0.095j \\ -0.087 + 0.034j & 0.061 + 0.095j & 0.107 \end{pmatrix};$$

|M1+M2|=0
M1+M2: eigenvalues are 0, 0.218 and 0.506:
Eigenvector after scaling: (0.434−0.011j, −0.418+0.199j, 0.764+0.115j)
One at a Time
Solve output 1, and then output 2. As 3>2 we should get the same answer.

$$M1 = \begin{pmatrix} 0.223 & 0.226 - 0.063j & -0.032 - 0.085j \\ 0.226 + 0.063j & 0.246 & -0.009 - 0.095j \\ -0.032 + 0.085j & -0.009 + 0.095j & 0.037 \end{pmatrix}; |M1| = 0$$

M1: eigenvalues are 0, 0 and 0.506:
Eigenvector V1: (0.748, −0.596−0.165j, 0.085−0.224j)
Eigenvector V2: (−0.062+0.026j, 0.096+0.350j, 0.929)
New problem; select a and b such that a·V1+b·V2 minimises output 2.
New transfer admittances are;
pv1=(P1_2 P2_2 P3_2)·V1=−0.287−0.250j
pv2=(P1_2 P2_2 P3_2)·V1=0.287+0.100j
We now repeat the process using these two transfer admittances as the outputs.
New error matrix is $$M1' = \begin{pmatrix} 0.145 & -0.107 + 0.043j \\ -0.107 - 0.043j & 0.093 \end{pmatrix}; |M1'| = 0,$$

i.e. exact solution possible
M1' eigenvalues, 0 and 0.237
Eigenvector after scaling: (0.608−0.145j, 0.772+0.114j)
Now combine V1 and V2 to get the inputs
(0.608−0.145j) V1+(0.772+0.114) V2=(0.404−0.095j, −0.352+0.268j, 0.737−0.042j)
Normalise and scale the result: (0.434−0.011j, −0.418+0.199j, 0.764+0.115j)
Notice that this is the same as before, just as it should be.

Example 2: m=3, n>=3

Here we have 1 acoustic pressure output and a number of velocity outputs.

Acoustic scaled error matrix is M1, summed velocity scaled error matrix is M2.

$$M1 = \begin{pmatrix} 3.928 & -2.667+2.473j & -2.674+2.506j \\ -2.667-2.473j & 3.367 & 3.393-0.018j \\ -2.674-2.506j & 3.393+0.018j & 3.418 \end{pmatrix};$$

$$|M1| = 0$$

$$M2 = \begin{pmatrix} 1.023 & 0.602-0.112j & 0.528+0.409j \\ 0.602+0.112j & 0.977 & -1.144+0.205j \\ -0.528-0.409j & -1.144-0.205j & 5.473 \end{pmatrix};$$

$$|M2| = 2.510$$

All at Once

All n output error matrices are summed and the eigenvector corresponding to the lowest eigenvalue is found.

Eigenvalues(M1+M2)=1.146, 3.869, 13.173
Solution=(0.739−0.235j, 0.483+0.306j, 0.246+0.104j)

One at a Time

Actually, we solve just the acoustics problem, then do the rest all at once. That way, the acoustics problem is solved exactly.

Eigenvalues (M1)=0, 0, 10.714
V1=(0.770−0.199j, 0.376+0.202j, 0.377+0.206j)
V2=(0.097−0.071j, 0.765+0.010j, −0.632+0.0016j)

As V1 and V2 both correspond to a zero eigenvalue, a·V1+b·V2 is also an eigenvector corresponding to a zero eigenvalue—i.e. it is an exact solution to the acoustics problem.

Form the "all at once" minimisation for the structural problem using a and b.

$$M2' = \begin{pmatrix} 1.314 & -0.381+0.341j \\ -0.381-0.341j & 0.093 \end{pmatrix}; |M2'| = 5.098$$

M1' eigenvalues, 1.222 and 4.172
Eigenvector after scaling: (0.984−0.016j, 0.113+0.115j)
Now combine V1 and V2 to get the inputs
(0.984−0.016j) V1+(0.113+0.115j) V2=(0.776−0.207j, 0.473+0.283j, 0.290−0.124j)
Normalise and scale the result: (0.755−0.211j, −0.466+0.270j, 0.246+0.104j)

Figure 10C:
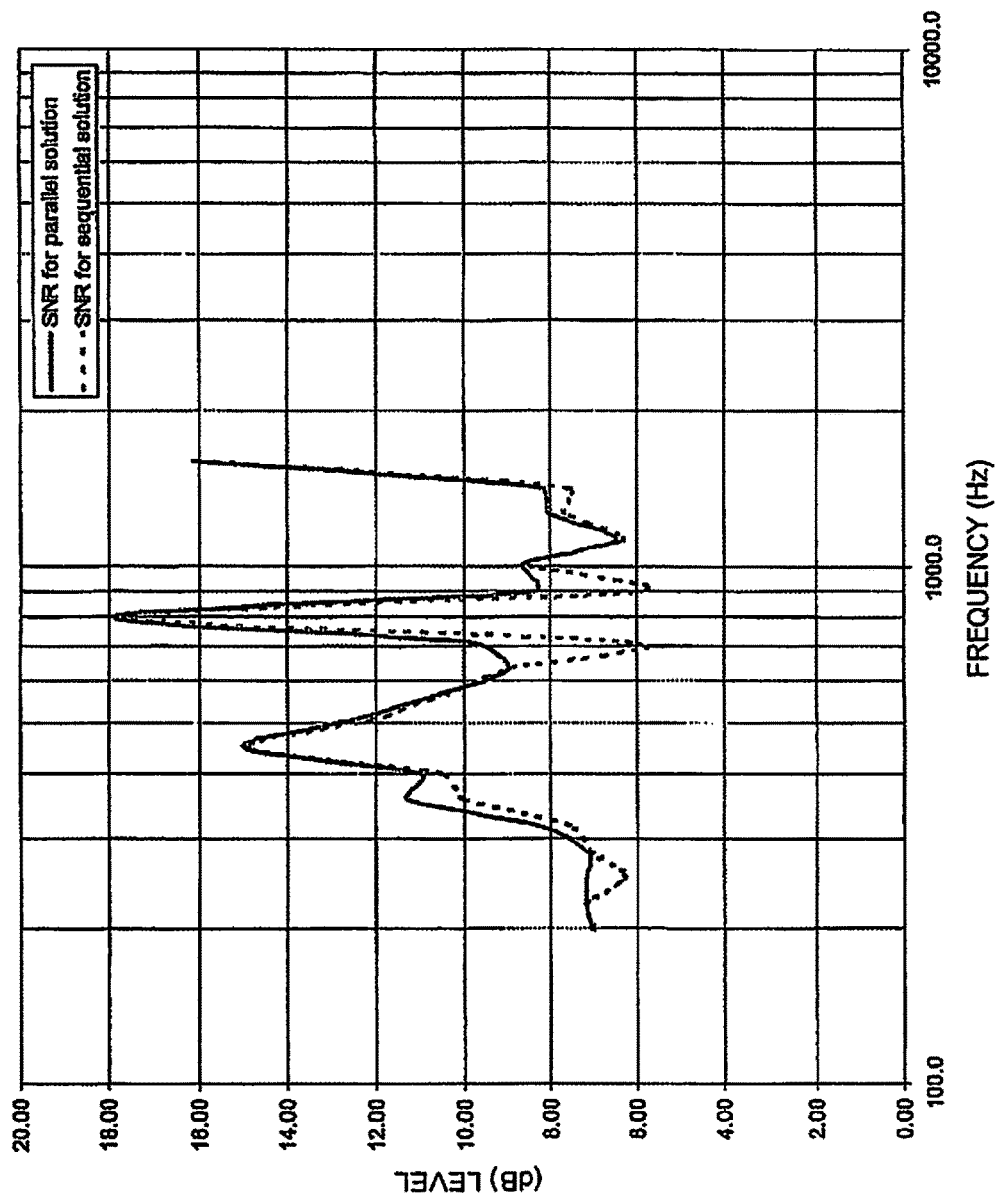

Notice that this is similar, but not identical to the "all at once" solution. When extended to cover a range of frequencies, it gives a precise result to the acoustics problem, where numerical rounding causes the very slight non-zero pressure in the sequential case). However, as shown in FIG. 10c, the sequential solution is a slightly worse solution to the structural problem compared to the parallel solution.

As set out above, the two methods are not mutually exclusive, and the parallel method may be adopted at any point in the sequential process, particularly to finish the process. The sequential method is useful where the number of inputs does not exceed the number of outputs, particularly when some of the outputs are more important than others. The important outputs are solved exactly, and those remaining get a best fit solution.

The invention claimed is:

1. A device, comprising:
a panel capable of supporting bending waves; and
means for applying signals to steer bending waves applied to the panel such that a wanted amplitude of vibration from the bending waves is maximized and a unwanted amplitude of vibration from the bending waves is minimized,
wherein the bending waves provide tactile feedback at a plurality of sensing areas of the panel and the signals steering the bending waves are such that the signal sensing area touched by the user is antinodal and each other sensing area is nodal, where an antinodal point is one that has maximum velocity and a nodal point is one that has no velocity at any frequency of excitation.

2. The device according to claim 1, wherein the device is a touch sensitive device and the panel comprises a touch sensitive screen.

3. The device according to claim 1, wherein the means for applying signals comprise signal processing means.

4. The device according to claim 1, wherein the device comprises a plurality of vibration exciters coupled to the panel to apply the bending waves.

5. The device according to claim 4, wherein the plurality of vibration exciters are spaced apart around the panel.

6. The device according to claim 4, wherein the plurality of vibration exciters are positioned at the periphery of the panel.

7. The device according to claim 4, wherein the means for applying signals is arranged to control at least one member selected from the group consisting of timing, phase and frequency of the signal to each plurality of vibration exciters.

8. The device according to claim 1, further comprising n number of sensing areas and n+1 number of vibration exciters.

9. The device according to claim 1, wherein the wanted amplitude of the applied bending waves is maximised at one of the plurality of a sensing areas touched by a user and the unwanted amplitude is reduced or minimised at each other plurality of sensing areas.

10. The device according to claim 4, wherein the panel is intendedly resonant and the signals applied by the vibration exciters resonate the panel.

11. The device according to claim 4, wherein the means applies signals to the plurality of vibration exciters to simultaneously provide multiple intended haptic signals at multiple locations that are being touched.

12. A method of operating a device, the method comprising:
applying signals to steer bending waves applied to a panel of the device, the panel supports the bending waves, such that wanted amplitude of vibration from the bending waves is maximized and unwanted amplitude of vibration from the bending waves is minimized,
wherein the bending waves provide tactile feedback at a plurality of sensing areas of the panel and the signals steering the bending waves are such that the signal sensing area touched by the user is antinodal and each other sensing area is nodal, where an antinodal point is one that has maximum velocity and a nodal point is one that has no velocity at any frequency of excitation.

13. A non-transitory, tangible, computer readable storage medium including computer readable instructions to cause a computer to carry out the method of claim 12.

14. The device according to claim 1 wherein the panel includes at least one sensing area for providing tactile feedback applied by a plurality of vibrational exciters.

* * * * *